United States Patent [19]

Muschelewicz et al.

[11] Patent Number: 6,020,412
[45] Date of Patent: Feb. 1, 2000

[54] CONTROLLED RELEASE COATING COMPRISING BLEND OF SILICONE POLYMER AND ADHESION PROMOTER

[75] Inventors: Kenneth J. Muschelewicz, Easley; Robert G. Posey, Duncan, both of S.C.

[73] Assignee: Mitsubishi Polyester Film, LLC, Greer, S.C.

[21] Appl. No.: 08/985,098

[22] Filed: Dec. 4, 1997

[51] Int. Cl.[7] .................................................. C08K 5/09
[52] U.S. Cl. .......................................... 524/296; 524/506
[58] Field of Search ...................................... 524/296, 506

[56] References Cited

U.S. PATENT DOCUMENTS

| | | | |
|---|---|---|---|
| 4,320,172 | 3/1982 | Takamizawa et al. | 428/447 |
| 4,423,095 | 12/1983 | Blizzard | 427/387 |
| 4,493,872 | 1/1985 | Funderburk et al. | 428/332 |
| 4,525,566 | 6/1985 | Homan et al. | 528/17 |
| 4,571,363 | 2/1986 | Culbertson | 428/332 |
| 4,615,947 | 10/1986 | Goossens | 428/412 |
| 4,624,900 | 11/1986 | Fau | 428/447 |
| 4,713,410 | 12/1987 | Katchko et al. | 524/524 |
| 4,803,233 | 2/1989 | Narula et al. | 524/58 |
| 5,154,759 | 10/1992 | Cifuentes | 106/3 |
| 5,169,888 | 12/1992 | Sales | 524/507 |
| 5,212,260 | 5/1993 | Culbertson | 525/446 |
| 5,318,815 | 6/1994 | Newing et al. | 428/317.7 |
| 5,350,601 | 9/1994 | Culbertson et al. | 427/412.1 |
| 5,366,808 | 11/1994 | Yip | 524/837 |
| 5,425,991 | 6/1995 | Lu | 428/352 |
| 5,428,107 | 6/1995 | Tysak | 525/102 |
| 5,525,427 | 6/1996 | Griswold | 524/837 |
| 5,547,711 | 8/1996 | Kirchmeyer | 524/837 |

FOREIGN PATENT DOCUMENTS 09 123372   5/1997   Japan .

*Primary Examiner*—Paul R. Michl

[57] ABSTRACT

A reclaimable release coating composition is provided which includes a blend of an adhesion promoter and a silicone release agent which may be applied from an aqueous solution, dispersion or emulsion. The components form regions of adhesion promoting sites disrupted by regions of release sites on the surface of a release backing substrate coated with the composition. The different regions are substantially homogeneously distributed across the entirety of the release surface. When used as a release coating for a backing to protect an adhesive, a controlled release force of a predictable value may be obtained by providing a known weight ratio of adhesion promoter to silicone release agent in the coating composition. A substantially linear relationship is also provided between the release force required to peel a non-silicone adhesive from the release coating surface, and the weight ratio of vinyl-functional polyorganosiloxane oil to hydrogen-functional siloxane crosslinker in the release agent, such that a consistent, uniform and repeatable release force from the surface may be obtained.

46 Claims, 2 Drawing Sheets

CONTROLLED RELEASE COATING COMPRISING BLEND OF SILICONE POLYMER AND ADHESION PROMOTER

FIELD OF THE INVENTION

The present invention relates to variable release film products, release film coating compositions, methods of making variable release films, and an adhesive product having at least one releasable backing. In particular, the present invention relates to coated release film products which are used as temporary support substrates for adhesives and adhesive coated articles including adhesive labels, adhesive shelf paper, removable lidding for microwavable food containers, peel-off labeling stickers, and double-sided tape. More specifically, the present invention relates to a temporary substrate made of polyester which has been in-line coated with an aqueous emulsion release composition, and methods for forming a release coating on a polyester film.

BACKGROUND OF THE INVENTION

A variety of adhesive sheet materials are currently used in the manufacture of adhesive labels, adhesive tapes, and double-sided adhesives. Adhesive sheet materials may be formed by providing a layer of adhesive on the surface of a sheet substrate such as paper, plastic film or metal foil. The layer of adhesive can be bonded to the surface of an article without the need to moisten the adhesive. Owing to the convenience of their use, there is a great and growing demand for adhesive sheet materials.

The sticky adhesive surface of an adhesive sheet material, adhesive patch, adhesive pad, or other adhesive product is often provided with a peelable or releasable protective sheet known as a release backing, a release sheet, a release layer or a release liner. The backing temporarily protects the sticky adhesive surface of the adhesive product from contamination by dust, debris, moisture and other contaminants until the label is ready for use. Generally, the peelable release backing is peeled from the adhesive surface immediately before use of the adhesive product.

The performance of the temporary protective backing is largely dependent on the combination of the adhesive which forms the adhesive layer of the adhesive product, and the release or anti-stick agent which imparts releasability to the surface of the peelable release backing. The release backing, once bonded to the sticky adhesive surface, must not spontaneously come off without a peeling force, but it must be readily removed with a relatively small peeling force, and the backing should not cause a decrease in the residual sticking power of the adhesive. It is also important that the backing releases easily enough from the adhesive product that the product does not tear when separated from the backing, and so that the adhesive layer of the product remains intact during separation.

With double-sided adhesive tapes, patches, and products it is desirable to have a peelable backing of a first release force on a first surface of the adhesive, and a peelable backing of a greater release force on the opposite second surface of the adhesive. Thus, the first adhesive surface can be adhered to an article while the second adhesive surface remains protected by the second backing. The second adhesive surface can remain protected until it is desired to expose the second adhesive surface for contact with a second article or another surface. For a rolled double-sided tape, a single protective sheet may be used having opposing release backing surfaces of different release characteristics, as opposed to providing two separate backings. A system of variable release backings or backing surfaces is therefore necessary to provide backing surfaces of different specified release force.

Silicone coated release substrates are known, particularly in applications where the substrate is paper. Silicone coated release substrates are most frequently produced by coating the substrate with a solvent or solventless silicone-based resin composition. As the silicone resin composition dries, it adheres to the substrate. A silicone release coating generally requires an extremely low release force to peel an adhesive therefrom. To date, a silicone release coating system has not been provided which enables a series of coatings of various release forces achieved by varying component amounts in the system.

U.S. Pat. No. 4,423,095 to Blizzard discloses a water-resistant adhesive release coating for a substrate such as paper. The coating composition comprises a liquid silicone resin and an organic polymer wherein the properties of the coating are not merely fractionally additive, based on weight, of the properties of the individual components, but are substantially undiminished from the respective properties of the neat components.

A need exists for an adhesive release composition which has release properties that vary in proportion to component weight ratios in the composition. A need also exists for a series of release coating compositions which can provide a series of release surfaces, for example, for double-sided tape, wherein each member of the series exhibits a predictable and repeatable release force and has a release force that is substantially linearly related to the compositional make-up of each member of the series. A need also exists for a release coating composition which can provide a release surface of uniform, repeatable, consistent and specified releasibility.

In view of the ever-growing need for recyclable and reclaimable industrial products, it would be advantageous to provide a release backing material that is reclaimable, particularly a reclaimable film substrate. Significant amounts of scrap film are generated during film-forming processes. Scrap film is normally comminuted, melted, extruded into the form of pellets, mixed with fresh virgin polymer, re-melted and re-fed to the film forming extruder. Temperatures of about 290° C. to about 300° C. may be encountered during reclamation processing of polyester reclaim film. Thus, for reclaimability, the coating on the film must be stable at these processing temperatures and must not impart an undesirable yellow discoloration or an undesired amount of impurities or gels to a finished product containing significant amounts of the reclaimed film. Preferably the coating can be effective at very low coat weights to minimize impurification of the ultimate product containing the reclaimed film.

Components that are known to decrease the reclaimability of many polymeric products include agents that depolymerize or decompose at reclamation temperatures, causing volatile or gaseous odoriferous by-products which deleteriously affect the reclaimed product or pose safety problems. Some coating compositions, for example, polyvinyl alcohol coatings, char at polyester reclamation temperatures and cause undesirable black specks and impurities or gels in a reclaimed polyester product. Crosslinking agents have been used in film coating compositions to enhance the adhesive qualities of a film coating and the durability of film coatings. However, as disclosed in U.S. Pat. No. 4,571,363 to Culbertson, et al., crosslinking agents may give rise to undesirable yellowing or discoloration when subjected to reclamation temperatures.

It has been found that the use of substantial amounts of coating compositions, cross-linking agents and/or nitrogen-containing antistatic agents in polymeric film coatings tends to result in yellowing, discoloration and foul odors when subjecting film sheets or scraps containing the agents to reclamation temperatures. It has been found that the use of substantial amounts of coating compositions, for example, more than about 1000 ppm based on the total weight of the coated film, tends to form undesired impurities or gels during reclamation. Thus, there is a need for a reclaimable release backing including a release coating which requires less than 1000 ppm coating composition, based on the weight of the coated film, to be effective and which does not substantially adversely affect reclaimability of the coated film substrate.

To avoid the production of coated scrap which may not be reclaimable in the production of oriented films, scrap may be removed along the longitudinal edges of the film where the film is held and stretched by tenters, prior to coating. However, as opposed to in-line coating techniques, removing scrap prior to coating requires additional processing because the film must be made and cut at one location, rolled, transported to another location, unrolled and coated off-line. In-line coating of film saves time and is more economical.

In-line coating techniques have been employed in the manufacture of coated polymeric films and provide efficient processes for forming uniform and thin films and coatings. It is desirable to provide an in-line coating method for forming a controlled release coating on the surface of a thin polymeric film, for example, on a polyester film. Polyester film can be used as a substrate for a release backing and can generally be made by extruding an amorphous melt of polyester onto a polished cooled casting drum to solidify the melt into sheet form. The sheet then undergoes a heating and stretching operation that orients the polymer chains making up the film, thus giving the film strength, stability and other desirable physical properties. After the film has been stretched in one or both direction(s), the film is generally heat-set at a temperature higher than the temperature at which it is stretched. Heat setting serves to lock-in the physical properties of the stretched polyester film. Manufacturing processes for producing polyester films are well known.

A coating composition for in-line application to a film surface should generally be quickly settable or curable for compatibility with film production rates. Additionally, the coating composition should be capable of being drawn with the substrate without undergoing deterioration in strength and transparency.

There is a need for a release coating composition which can be formed in-line during a polymeric film manufacturing process and which requires no extraneous heating step to dry or cure the coating composition, but which instead takes advantage of the heat necessary for film orientation in a drying or curing step.

The present invention provides a controlled release backing having a release surface of repeatable, consistent, homogeneous and specified releasibility. The present invention also provides a system of compositions which can provide a progressive series of release surfaces having different release forces wherein each member of the series exhibits a repeatable and consistent relationship between its compositional make-up and the release force.

The present invention provides a process for making a controlled release backing in-line during a polymeric film manufacturing process and which requires no extraneous heating step to dry or cure the release coating composition which is applied in-line to the film substrate.

The present invention also provides a reclaimable controlled release backing comprising a coating composition which does not substantially adversely affect reclaimability of a polyester film substrate and which does not undergo substantial gel or impurity formation, yellowing, discoloration or odor formation upon being subjected to polyester film reclaiming temperatures. The present invention provides a coated polyester controlled release substrate comprising a release surface made of a composition which, at an effective coat weight, enables useful reclamation of the polyester substrate without causing substantial impurity formation, yellowing and odor.

SUMMARY OF THE INVENTION

The present invention provides a release coating composition which may be applied from an aqueous emulsion to a polymeric film substrate, which does not substantially adversely affect reclaimability of the film substrate, and which exhibits controllable release properties in applications as a release backing for protecting an adhesive.

According to embodiments of the present invention, a release backing is provided which includes a tentered in-line coated polymeric film, for example, an oriented polyester film, having a coating thereon of a thickness and formulation sufficient to act as a controlled release surface, wherein the coating comprises:(1) a water-soluble, water-dispersible or water-emulsifiable monomeric and/or polymeric adhesion promoter intimately and homogeneously mixed with (2) a water-soluble, water-dispersible or water-emulsifiable cross-linkable silicone release agent or composition.

According to embodiments of the present invention, a process is provided for forming a release surface on a substrate wherein the process comprises extruding an amorphous melt of polyester onto a chilled casting drum to form a film, orienting the film in one or both direction(s), coating the film before or after orientation with a coating of the invention having a thickness sufficient to perform as a controlled release coating, and heat-setting the coated film, wherein the coating comprises a uniform mixture of: (1) a water-soluble or water-dispersible adhesion promoter, and (2) an aqueous-based silicone release agent or composition.

According to embodiments of the present invention, a release coating composition is provided which comprises a blend of an adhesion promoter and a silicone release agent, and which may be applied from an aqueous emulsion. The components form regions of adhesion promoting sites disrupted by regions of release sites with the different regions being substantially homogeneously distributed across the entirety of a release coating surface made with the composition. In accordance with the present invention, a controlled release force of a repeatable value may be obtained by providing a known weight ratio of the adhesion promoter to the silicone release agent. According to embodiments of the invention, a substantially linear relationship may be obtained between the release force of the coating and the weight ratio of the adhesion promoter to silicone release agent. As the weight ratio of adhesion promoter to release agent increases, the release force required to remove a standard adhesive correspondingly increases in a substantially linear manner.

According to embodiments of the invention, a release coating composition is provided which comprises an adhesion promoter and a silicone release agent wherein the force required to release a non-silicone adhesive from a coating made of the composition can be controlled to be from about 50 grams per inch (gm/in) to about 1000 gm/in, depending upon the weight ratio of the adhesion promoter to the release agent. According to embodiments of the invention, the release force is substantially linearly related to the weight ratio of polyorganosiloxane silicone oil to silicone hydride crosslinker in the silicone release agent.

According to embodiments of the invention, methods of making variable release films are provided wherein a release coating composition is applied to a substrate and heated and/or dried to form a release coating on the substrate. In accordance with some embodiments of the invention, the substrate comprises a polyester film, particularly polyethylene terephthalate, and the method includes in-line coating the film and drying or curing the release coating substantially simultaneously with tentering or orienting the film while utilizing the heat for tentering to cause drying or curing.

According to some embodiments of the invention, a release coating composition is provided having an adhesion promoter or adhesion promoter system that cures or polymerizes under temperature conditions used for tentering a polymeric film substrate on which the coating is applied. According to preferred embodiments, curing or polymerizing of the adhesion promoter requires no additional heat treatment beside the temperature and conditions maintained for film tentering.

According to yet other embodiments of the invention, an adhesive product is provided and includes a non-silicone adhesive and a releasable backing having a release surface according to the invention in contact with a surface of the adhesive. According to some embodiments of the invention, the adhesive is a rubber adhesive, an acrylic adhesive, a terpene adhesive, or a styrene-butadiene adhesive. In accordance with some embodiments of the invention, a double-sided adhesive is protected or backed on opposite sides by (1) two respective release backings according to the invention, or (2) a backing with two release surfaces, wherein the two release backings or surfaces exhibit different release forces from the adhesive.

According to embodiments of the invention, a reclaimable controlled release backing is provided having a release coating comprising a blend of adhesion promoter and release agent that do not form membrane gels during reclamation, and which do not yellow, discolor, or produce foul-odors at polyester reclamation temperatures, for example, temperatures of from about 290° C. to about 300° C.

According to embodiments of the invention, the release coating composition may contain non-yellowing, non-gelling amounts of adhesion promoter and release agent. The adhesion promoter may comprise a single monomer or polymer, or may comprise a mixture, blend, solution or emulsion of more than one monomer or polymer. The release agent may comprise a single monomer or polymer, or may comprise a mixture, blend, solution or emulsion of more than one monomer or polymer. According to embodiments of the invention, the types and amounts of each of the adhesion promoter and release agent are such that the controlled release composition is non-yellowing and non-gelling upon reclamation of a polyester substrate to which the composition is applied. According to embodiments of the invention, the adhesion promoter and release system do not depolymerize to form volatile or gaseous by-products at reclamation temperatures. Coating durability, adhesiveness to the substrate and release force, as well as gel formation, yellowing, discoloration, and odor formation at reclamation temperatures, may be controlled by the use of controlled release compositions according to embodiments of the invention.

The adverse effects on reclaimability of polyester substrates caused by many polymers used heretofore are known. However, it has surprisingly been found that the release coatings used in accordance with embodiments of the present invention do not substantially adversely affect reclaimability of a polyester substrate and do not prevent polyester substrates, for example, polyethylene terephthalate films, from being efficiently reclaimed.

DETAILED DESCRIPTION OF THE INVENTION

Figure 1:
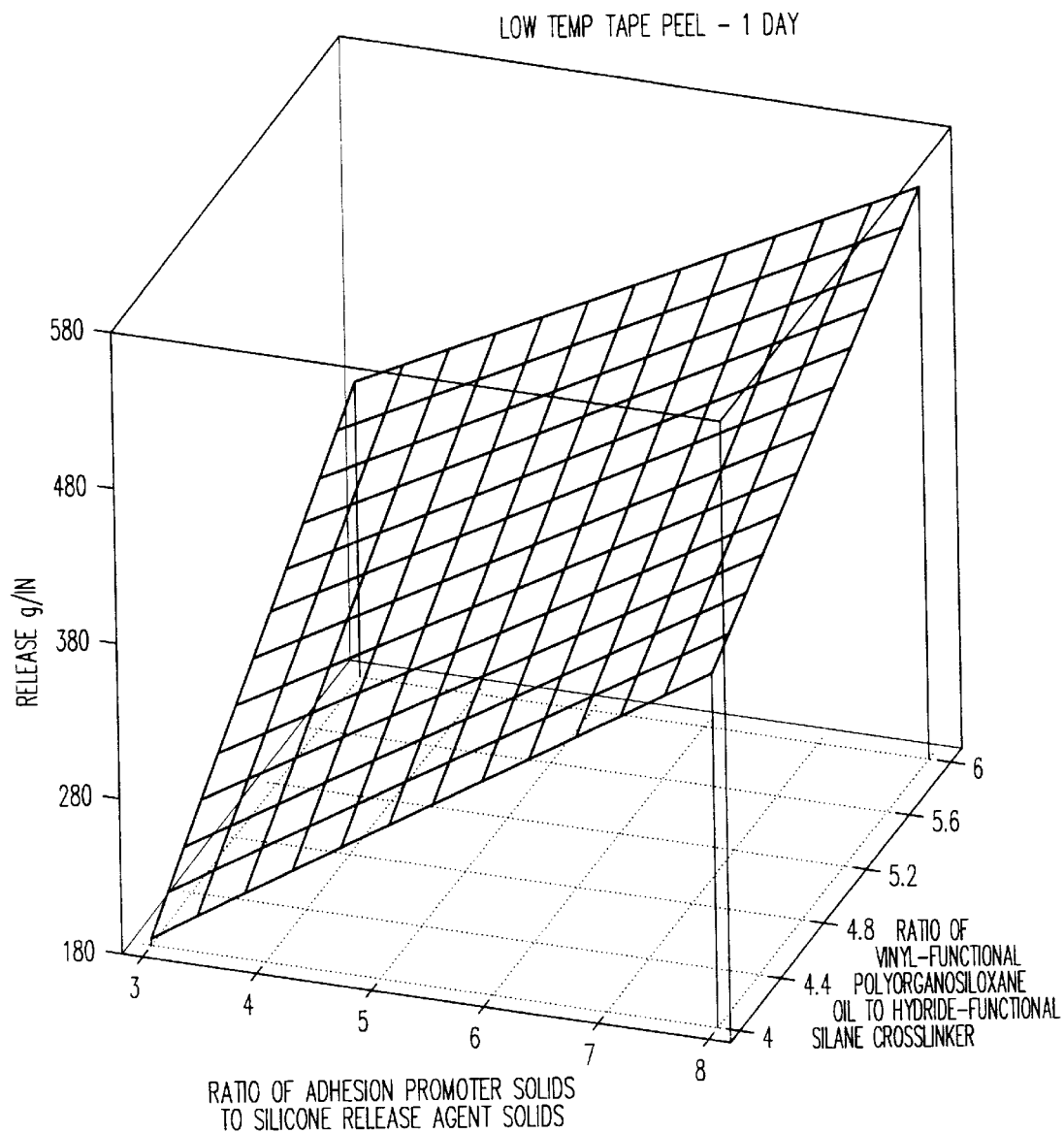
FIG. 1 is a three-dimensional graph showing (1) the release force required to peel TESA 7475 adhesive test tape from release backings made according to the present invention, wherein ambient peeling occurred after one-day aging under high temperature conditions, (2) the relationship between release force and the weight ratio of adhesion promoter to release agent, and (3) the relationship between release force and the weight ratio of vinyl-functional polyorganosiloxane oil to hydride-functional silicone crosslinker in the release agent.

According to embodiments of the present invention, a release substrate, for example, a release film, is provided having a release surface. The release surface comprises a cured blend of a water-soluble, water-dispersible or water-emulsifiable adhesion it promoter and a water-soluble, water-dispersible or water-emulsifiable silicone release agent. According to embodiments of the present invention, a coating composition is provided comprising an aqueous formulation of the adhesion promoter and the silicone release agent.

According to embodiments of the invention, a controlled release composition is provided for forming a release surface which yields a substantially direct correlation or a substantially linear relationship between the release force required to peel a given adhesive from the surface and the weight ratio of adhesion promoter solids to release agent solids in the coating composition, particularly over the weight ratio range of from about 0.2:1 to about 20:1. Thus, a desired, consistent and repeatable release force can be achieved in a release coating composition by choosing the solids weight ratio of adhesion promoter to release agent. The present invention provides a system of release coating compositions wherein each composition of the system has the same adhesion promoter and release agent but differing release properties which are substantially linearly related to the solids weight ratio of the promoter to the release agent.

According to embodiments of the invention, the weight ratio of adhesion promoter solids to silicone release agent solids is greater than about 0.1:1. According to some embodiments of the invention, the weight ratio of cured adhesion promoter to cured silicone release agent is from about 0.2:1 to about 20:1 and may be dependent upon the particular adhesion promoter employed, for example, the range of from about 3:1 to about 8:1 for a sulfomonomer copolyester adhesion promoter according to some embodiments of the invention. The release coating preferably comprises from about 50% by weight to about 90% by weight adhesion promoter solids and from about 10% by weight to about 50% by weight release agent solids.

According to embodiments of the invention, a release coating system is provided comprising an adhesion promoter and a release agent wherein the force required to release a non-silicone adhesive from a coating of the system can be controlled to be from about 50 grams per inch (gm/in) to about 1000 gm/in depending upon the weight ratio of the adhesion promoter to the release agent.

According to embodiments of the invention, a release coating system is provided comprising an adhesion promoter and a silicone release agent wherein the force required to release a non-silicone adhesive from a coating of the system can be controlled to be from about 50 grams per inch (gm/in) to about 1000 gm/in depending upon both the weight ratio of the adhesion promoter to silicone release agent and the weight ratio of polyorganosiloxane oil to polysiloxane hydride crosslinker in the silicone release agent.

According to embodiments of the invention, neither the adhesion promoter, the release agent, nor the blend of both substantially forms a membrane gel or substantially yellows upon heating to reclamation temperatures. In evaluating reclaimability, a delta yellowness index (Hunter Labs YI based on L,a,b color) due to the coating at about 200 ppm per mil of film may be used to evaluate yellowness compared to other reclaimable coatings and films. Reclaimability may also be evaluated by microscopic examination of samples subjected to reclaim conditions for excessive production of crosslinked gels or membrane gels. The gelling characteristics may be evaluated in terms of gel particle size and amounts relative to those for known reclaimable products. Odor may be evaluated relative to odor production for known reclaimable products.

According to some embodiments of the invention, the adhesion promoter comprises a curable reactive monomer system which cures after being coated onto the substrate and subsequently heated or dried. Preferably, the silicone release agent comprises a crosslinkable silicone system which is compatible with the adhesion promoter to form a homogeneous dispersion, for example, an aqueous emulsion of the adhesion promoter and the silicone release agent. According to some embodiments of the invention, the adhesion promoter and the silicone release agent are both reactive systems which polymerize and/or crosslink after being applied to a substrate surface and subsequently heated or dried.

In embodiments of the invention wherein the adhesion promoter comprises a reactive monomer system, the composition is preferably heated or dried under conditions sufficient to cure or polymerize the reactive system. In embodiments of the invention wherein the release agent comprises a cross-linkable silicone system, the composition may be heated or dried under conditions sufficient to crosslink or cure the silicone system. The resulting cured release coating exhibits thereon a substantially uniform and homogeneous distribution of cured adhesion promoter sites and cured silicone polymer release sites. According to some embodiments of the present invention, the sites are in the form of discrete islands of adhesion promoter and islands of release agent. According to some embodiments of the present invention, the release coating comprises an interpenetrating network of adhesion promoter and release agent. There may be some cross-linking or hydrogen bonding between adhesion promoter and release agent in the coated, dried and cured coating composition.

According to some embodiments of the invention, a release coating composition is provided having an adhesion promoter or adhesion promoter system that cures or polymerizes under temperature conditions used for tentering a polymeric film substrate on which the coating is applied. According to preferred embodiments, curing or polymerizing of the adhesion promoter requires no additional heat treatment and occurs at the temperature maintained for film tentering. According to embodiments of the invention, the release coating composition is applied after the first stretching procedure and before the second stretching procedure during formation of a biaxially oriented polymeric film.

According to embodiments of the invention, the adhesion promoter may be a copolyester generally prepared as described in U.S. Pat. No. 4,493,872 to Funderburk et al., which is incorporated herein in its entirety. However, according to the present invention, the percentage of the sulfomonomer range is slightly broader for the present invention than that set forth in the above patent. Moreover, the sulfomonomer-containing adhesion promoter used according to some embodiments of the present invention is not limited to an alkali metal sulfonate group as disclosed in the Funderburk et al. patent. The sulfomonomer group used according to some embodiments of the present invention may comprise any sulfomonomer in which a sulfonate group is attached to a dicarboxylic nucleus. It is noted in the above patent that the lower limit for the sulfomonomer group is stated to be 5 mol percent, and that this amount is required to impart water dispersibility to the primer. According to embodiments of the present invention, a slightly lower amount of the sulfomonomer group may be employed in the adhesion promoter composition.

The adhesion promoter component used according to some embodiments of the present invention may comprise, before dilution: a first component (I) comprising (a) from about 65 to about 95 mol percent solids of isophthalic acid or an alkyl isophthalate or dialkyl isophthalate derivative thereof, (b) about 0 to 30 mol percent solids of at least one aliphatic dicarboxylic acid, and (c) from about 5 to about 20 mol percent solids of at least one sulfomonomer containing a sulfonate group attached to a dicarboxylic nucleus, wherein the total of (a), (b) and (c) is 100 mol percent solids; and a second component (II) comprising (d) a stoichiometric quantity, for example, about 100 mol percent solids based on the total mols of (a), (b) and (c), of at least one copolymerizable glycol having from about 2 to about 11 carbon atoms.

The aliphatic dicarboxylic acids, sulfomonomers, and glycols which may be employed in the adhesion promoter according to embodiments of the present invention may be those described in the aforementioned Funderburk et al. patent. Sulfomonomers according to some embodiments of the present invention may be generally represented by the formula:

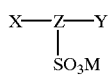

wherein M is a monovalent cation and may be selected from hydrogen, the group of alkali metals, ammonium, substituted ammonium and quaternary ammonium; Z is a trivalent radical; and X and Y are carboxyl groups or polyester forming equivalents. Sulfomonomers wherein Z is aromatic are disclosed in U.S. Pat. Nos. 3,563,942 to Heiberger and 3,779,993 to Kibler et al., which are both incorporated herein by reference. Species of such monomers include sodium sulfoterephthalic acid; ammonium sulfoterephthalic acid; sodium 5-sulfoisophthalic acid; sodium sulfophthalic acid; ammonium sulfophthalic acid; 5-(p-sodiosulfophenoxy) isophthalic acid; 5-(sulfopropoxy) isophthalic acid, sodium salt; and like materials as well as their polyester forming equivalents, for example, the dimethyl esters of those species, including dimethyl-5-sulfo isophthalate, sodium salt.

Sulfomonomers wherein Z is aliphatic are disclosed in U.S. Pat. No. 3,734,874 to Kibler et al. and U.S. Pat. No. 5,350,601 to Culbertson et al., which are also incorporated herein by reference. Other examples of aliphatic sulfomonomers are sulfonated aliphatic dicarboxylic acids (or their ester equivalents) wherein the sulfonated group depends from a trivalent alkyl group. Examples are sulfopropyl malonic acid

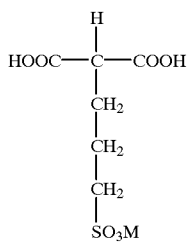

where Z in the aforementioned general formula is the CH—CH$_2$—CH$_2$—CH$_2$ group, and sulfonated succinic acid

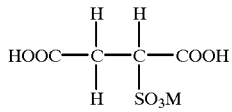

where Z in the aforementioned general formula is the CH$_2$—CH group.

Glycols which may be used with the sulphomonomers include ethylene glycol; diethylene glycol; butanediol; 1,5-pentanediol; 1,6-hexanediol; neopentyl glycol; 1,10-decanediol; cyclohexane dimethanol; and similar materials. Ethylene glycol is a preferred glycol. The adhesion promoter may also contain a polyalkylene glycol, for example, polyethylene glycol.

Examples of suitable aliphatic dicarboxylic acids which may be used with the sulphomonomers include malonic, adipic, azelaic, glutaric, sebacic, suberic, succinic and brassylic acids, and mixtures thereof, or their polyester forming equivalents. Sebacic acid is a preferred diacid.

To the extent applicable, U.S. Pat. No. 4,493,872 to Funderburk et al. is incorporated herein by reference.

According to embodiments of the present invention, the sulphomonomer adhesion promoter may comprise at least one ester formed from a phthalic acid radical of the formula C$_6$H$_4$(COO)$_2$=, and an alkylene diol. According to some preferred embodiments of the invention, the at least one ester comprises dimethylisophthalate and a sodium salt of dimethyl-5-sulfo isophthalate in a ratio of from about 5:1 to about 15:1. Preferably, the diol comprises ethylene glycol. The diol may be a polyalkylene glycol, for example, polyethylene glycol. The ratio of the at least one ester to the diol may be from about 0.1:1 to about 10:1, for example about 1:1.

According to yet other embodiments of the invention, the adhesion promoter of the controlled release composition may A comprise a water-dispersible acrylic emulsion of at least one alkyl acrylate. According to some embodiments of the invention, the at least one alkyl acrylate comprises methyl methacrylate, ethyl acrylate and at least one of (1) a methacrylamide and an esterified triazine, or (2) N-methylolacrylamide, or a prepolymer thereof. According to some embodiments of the invention, the adhesion promoter comprises an acrylic emulsion including at least one reactive monomer which polymerizes upon drying or heating the release coating composition. When coating compositions having reactive monomers or oligomers are employed, the composition may comprise a pH adjusting agent or other additives to prevent undesired premature polymerization or curing of the reactive component. According to some embodiments, the adhesion promoter may comprise from about 30% by weight to about 50% by weight methyl methacrylate, from about 30% by weight to about 50% by weight ethyl acrylate, from about 1% by weight to about 10% by weight methacrylamide, and from about 5% by weight to about 25% by weight of a reactive esterified triazine.

According to some embodiments of the invention, the adhesion promoter comprises from about 70% by weight to about 90% by weight, for example, about 80% by weight of a component (A) and from about 10% by weight to about 30% by weight, for example, about 20% by weight of a component (B). Component (A) comprises a prepolymer of from about 45% by weight to about 50% by weight methyl methacrylate, from about 45% by weight to about 50% by weight ethyl acrylate, and from about from about 2% by weight to about 8% by weight methacrylamide. Component (B) comprises an esterified triazine. Preferably the esterified triazine of component (B) comprises hexamethoxymethyl melamine, for example, CYMEL 385, available from Rohm & Haas Corporation, Philadelphia, Pa.

Aqueous emulsion coating compositions including CYMEL 385 may be pH adjusted to be alkaline so as to prevent undesired premature reaction or polymerization of the reactive CYMEL 385 component. Upon coating the emulsion onto a substrate and drying or heating, the pH adjusting agent and emulsion or suspension carrier liquid may be evaporated and thus no longer able to prevent reaction of the CYMEL 385. As a result, the CYMEL 385 polymerizes or otherwise reacts in-situ upon drying and/or heating of the coated emulsion.

N-methylolacrylamide may be used as a cross-linker for the acrylic-based adhesion promoter of the present invention. If used, N-methylolacrylamide is preferably present in an amount of about 6% by weight or less, based on the total weight of the adhesion promoter. According to embodiments of the invention, to prevent substantial gel formation upon reclamation the amount of cross-linker, whether N-methylolacrylamide or other crosslinker, in the adhesion promoter or in the release agent is preferably limited to 6% by weight or less based on the weight of the adhesion promoter or release agent incorporating the crosslinker. Higher amounts, for example, more than 10% by weight cross-linker, particularly N-methylolacrylamide, tend to result in the substantial production of gel particles or membrane gels when the coating composition is subjected to reclamation temperatures. According to some embodiments of the invention, the only crosslinker present in the adhesion promoter is a reactive comonomer. For example, the only crosslinker present in the adhesion promoter may be N-methylolacrylamide.

According to some embodiments of the invention, the adhesion promoter comprises from about 40% by weight to about 80% by weight methyl methacrylate, from about 20% by weight to about 50% by weight ethyl acrylate, and from about 1% by weight to about 8% by weight N-methylolacrylamide. Preferably, the promoter comprises from about 55% by weight to about 65% by weight methyl methacrylate, from about 30% by weight to about 40% by weight ethyl acrylate, and from about 3% by weight to about 7% by weight N-methylolacrylamide.

The acrylic-based polymeric adhesion promoters according to embodiments of the present invention, and other adhesion promoters according to the invention, may be prepared by a conventional polymer synthesis at a temperature of from about 40° to 60° C., as described in *Principles of Polymerization*, by George Odian, second edition, published by John Wiley and Sons. In practice, the acrylic or acrylate monomer components, crosslinker, and one or more various surfactants may be slowly metered into an aqueous solution. The various surfactants may be anionic or nonionic surfactants. Exemplary nonionic surfactants are alkylphenol ethoxylates, such as octyl phenol ethoxylate available from Rohm & Haas Co., Philadelphia, Pa., from Union Carbide Corporation, New York, N.Y., and from BASF, Spartanburg, S.C. Exemplary anionic surfactants include sodium lauryl sulfate or sodium dodecylbenzene sulfonate. The aqueous solution may also contain a redox initiator system. Typical initiators for polymerization reactions are peroxide compounds such as lauryl peroxide, benzoyl peroxide, methyl ethyl ketone peroxide, and the like.

As in all polymerization reactions, water quality is an important consideration. Deionized water should be used since the presence of certain multivalent ions in uncontrolled concentrations can interfere with both the initiation process and the action of any emulsifier.

As the comonomer is slowly metered into the water containing the surfactants and the initiator, copolymerization of the two or more comonomers begins, thereby forming particles of the coating composition. Near the completion of the copolymerization reaction, the reaction mixture will comprise small particles suspended in water due to the nonionic and anionic surfactants. This mixture may typically have a solids level of from 25 to 30 percent. The mixture may be used at that concentration, diluted with water or solvent, concentrated, or dried for admixture with the other coating composition components including the release agent component.

A method to form a coating composition according to the present invention may comprise diluting the adhesion promoter component to a concentration of from about 2% by weight to about 12% by weight solids content with the remainder being water or a water/organic solvent or emulsion medium. The diluted emulsion, solution or mixture may then be combined with a release component, for example, a silicone release composition, and with any remaining coating composition components. According to embodiments of the invention, the release agent may comprise a polymerizable formula which after application to a backing substrate may be polymerized to form a release agent. According to some embodiments of the invention, the release agent may comprise a polymerized silicone release formula which has been polymerized before application to a backing substrate.

According to yet other embodiments of the invention involving a reactive monomeric adhesion promoter or adhesion promoter system, the adhesion promoter may comprise a water-dispersible cross-linkable aminosilane. Preferably, the aminosilane is provided in an aqueous solution and reacts in-situ upon drying or heating the solution after coating. According to some embodiments of the invention, an amino-silane adhesion promoter is provided which comprises an aminoalkylalkoxysilane. The aminoalkylalkoxysilane promotes bonding between the polymeric interpenetrating network of the adhesion promoter and release agent, and between the network and the substrate. The use of an aminoalkylalkoxysilane adhesion promoter may be preferred when the substrate is a polyester film, for example, a polyethylene terephthalate film. Aminoalkylalkoxysilane adhesion promoters may advantageously be used in combination with a silicone release agent system that includes a glycidoxy silane component. Preferred glycidoxysilane components for use in silicone release agent systems that are compatible with an aminoalkylalkoxysilane adhesion promoter are discussed below.

The silane component may be an aminoalkylalkoxysilane, for example, aminopropyltrimethoxysilane or aminopropylmethyl-diethoxysilane, or generally any aminoalkylalkoxysilane represented by the formula X—Y—Si—$R_1R_2R_3$, i.e.

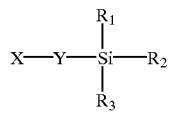

where X is a an amino group, Y is an alkylene group, for example, methylene, ethylene, propylene, etc., $R_1$ and $R_2$ are hydrolyzable groups, for example, methoxy, ethoxy, acetoxy, and the like, and $R_3$ may be a hydrolyzable group or a non-hydrolyzable group. If $R_3$ is a non-hydrolyzable group, $R_3$ may be an alkyl group, for example, methyl, ethyl, and the like, or an aryl group, for example, phenyl, naphthyl, and the like. These silanes may possess water solubility or water dispersibility, as well as organic solvent solubility or dispersibility.

According to embodiments of the invention, the adhesion promoter comprises a polymerization product of N-(2-aminoethyl)-3-aminopropyltrimethoxysilane, for example, the polymerization product of Z-6020 available from Dow Chemical Company, Midland, Mich. If an amino-silane is used as an adhesion promoter, the polymerization product thereof is preferably a three-dimensional cross-linked monofunctional polysiloxane which crosslinks during heating or drying after application of the controlled release coating composition to a substrate.

A method of forming a polymeric aminosilane adhesion promoter system according to embodiments of the invention involves adding a substantially or completely pure liquid aminoalkylalkoxysilane precursor to water under conditions wherein the alkoxy groups of the precursor react with the water to form hydroxyl groups and an alcohol, and the hydroxyl groups of adjacent reacted silanes condense to form a siloxane bond between the adjacent silanes, and water. The resultant aminosilane polymer is a three-dimensional cross-linked mono-functional polysiloxane.

An exemplary condensation polymerization reaction may be represented as follows:

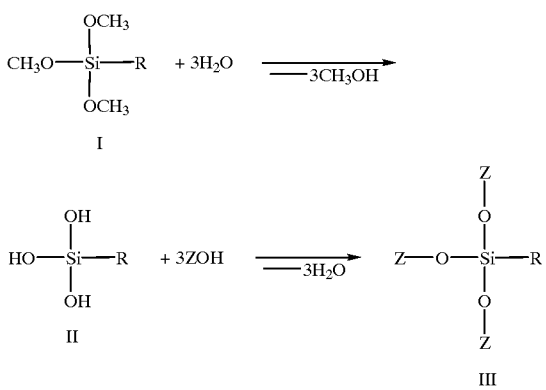

wherein R is $CH_2CH_2CH_2$—NH—$CH_2CH_2$—$NH_2$ and Z is monomer II after condensation of at least one hydroxyl group from monomer II. The resulting adhesion promoter polymer system is a three-dimensional cross-linked monofunctional polysiloxane having exposed R groups at the surface of a controlled release layer comprising the polysiloxane. Methods of polymerizing aminosilanes according to the foregoing and related techniques are disclosed in U.S. Pat. Nos. 4,898,786; 4,939,035; 4,954,396; 5,022,944; 5,064,722; and 5,082,738; each of which is to Swofford or Swofford et al. and incorporated herein by reference.

The amount of aminosilane employed may be up to about 100% by weight based on the total weight of the adhesion promoter polymer system, and is preferably makes up about 80% or more of adhesion promoter systems employing an aminosilane.

According to preferred embodiments of the invention, controlled release backings including an aminosilane adhesion promoter are reclaimable and do not form impurities or gel particles, membrane gels, yellowness or odor at polyester film reclamation temperatures, for example, in the range of from about 290° C. to about 300° C. Preferably, the aminosilane does not depolymerize at reclamation temperatures and does not form volatile or gaseous by-products at reclamation temperatures.

According to embodiments of the invention, the release agent may comprise a reactive, cross-linkable silicone system. The reactive silicone system cures or crosslinks to provide the release agent component of the coating composition. According to some embodiments of the invention, the silicone system comprises a curable mixture of a hydrogen- or alkoxy-functional polysiloxane and an elastomeric polysiloxane carrying groups reactive with the Si—H or Si—OR groups of the functional polysiloxane, wherein R denotes an alkyl or alkoxyalkyl group containing from 1 to 10 carbon atoms. When the substantial absence of organic solvent is desired, the reactive polysiloxanes may comprise: (A) a hydrogen- or alkoxy-functional polysiloxane; and (B) an elastomeric vinyl- or hydroxy-terminated polysiloxane which is reactive with the hydrogen- or alkoxy-functional polysiloxane. According to embodiments of the invention, the reaction yields a release agent component for a controlled release composition. Other silicone or silane materials may be incorporated into release agent but tend not to be essential.

The Si—H or Si—OR groups are reactive in various ways. The Si—H groups of the hydrogen-functional polysiloxane are reactive with the second polysiloxane if the second polysiloxane carries unsaturated groups, for example, vinyl groups, or hydroxy groups. For example, the hydrogen groups of a hydrogen-functional polysiloxane are reactive with the vinyl groups in a vinyl-terminated polysiloxane and also with unsaturation on-chain in an unsaturated polysiloxane oil. This reaction is catalyzed with a platinum catalyst, for example, hexachloroplatinic acid. The Si—H groups of the hydrogen-functional polysiloxane may be reactive with hydroxy-functionality in the water soluble or water dispersible adhesion promoter. The hydrogen groups of the hydrogen-functional polysiloxane may be reactive with hydroxy-functionality in a hydroxy resin. The hydroxy groups of the hydroxy resin are reactive with the preferred aminoplast cross-linking agent, and an acid catalyst such as dodecyl benzene sulfonic acid is used to encourage this reaction. The reaction with hydroxy groups may be catalyzed by a metal salt catalyst. The reaction may be catalyzed with a metal salt wherein the metal ion is selected from the lead to manganese electromotive force series. This series of metal catalysts is well known and is illustrated by a tin salt of a monocarboxylic or dicarboxylic acid, such as dibutyl tin diacetate. Alkoxy-functionality, if selected, may be reactive with hydroxy functionality in the adhesion promoter component and/or in the polysiloxane, and a tin-type catalyst assists reactions with alkoxy-functionality.

Hydrogen-functional polysiloxanes, alkoxy-functional polysiloxanes, hydroxy-functional polysiloxanes, and vinyl-functional polysiloxanes are all available in commerce as generally low viscosity, easily flowable liquid resins. The silicone release agents according to embodiments of the present invention may be used in aqueous emulsions.

The several polymerization reactions which may be provided from the release agent formulation may also provide adhesion between the coating composition and the substrate or backing. To further improve the adhesion between the layers, silane coupling agents can be added and are usually trimethoxysilanes containing an amine, mercaptan or epoxy functional group as the fourth substituent on the silane silicon atom, as is known.

According to preferred embodiments of the invention, the release agent may be a silicone system comprising a cross-linked reaction product of a diorganopolysiloxane silicone oil substituted with at least one substituent selected from the group consisting of terminal vinyl groups and pendant vinyl groups. Preferably, the reaction product comprises a cross-linked dialkyl/alkylvinyl-polysiloxane having both terminal and pendant vinyl groups. According to some embodiments of-the present invention, the silicone system may comprise the reaction product of a diaryl- or an alkylaryl-polysiloxane substituted with at least one of terminal vinyl groups and pendent vinyl groups.

The diorganopolysiloxane may preferably have the formula (I) shown below:

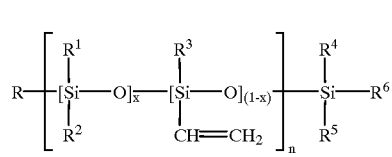

wherein R is an organic or siloxane group, each of $R^1$, $R^2$, $R^3$, $R^4$, $R^5$ and $R^6$ is an organic group, $n \geq 3$ and x is no greater than 0.999. Preferably, at least one of R and $R^6$ is a vinyl radical. Each of R, $R^1$, $R^2$, $R^3$, $R^4$, $R^5$ and $R^6$ may be radical selected from the following groups: alkyl, aryl, aralkyl, alkaryl, alkenyl, cycloalkyl, cycloalkenyl or phenyl, including at least one vinyl radical. Exemplary of these substituents are methyl, ethyl. propyl, butyl, vinyl, allyl, tolyl, xylyl, benzyl, cyclohexyl, phenylethyl and naphthyl groups. Each of R, $R^1$, $R^2$, $R^3$, $R^4$, $R^5$ and $R^6$ may be a halo-substituted hydrocarbon radical, an amino-substituted hydrocarbon radical or a cyano-substituted hydrocarbon radical.

According to preferred embodiments of the present invention, each of R, $R^1$, $R^2$, $R^3$, $R^4$, $R^5$ and $R^6$ in formula (I) above is a hydrocarbon containing from 1 to 10 carbon atoms. Preferably, each of $R^1$, $R^2$, $R^3$, $R^4$ and $R^5$ is an alkyl or phenyl radical and at least one of R and $R^6$ is a vinyl radical. According to some embodiments of the present invention, each of $R^1$, $R^2$, $R^3$, $R^4$ and $R^5$ is an alkyl radical containing from 1 to 3 carbon atoms and at least one of R and $R^6$ is a vinyl radical. Preferably, each of $R^1$, $R^2$, $R^3$, $R^4$ and $R^5$ is a methyl radical and at least one of R and $R^6$ is a vinyl radical. According to some embodiments, the polysiloxane is dimethylvinyl terminated or divinylmethyl terminated.

The organopolysiloxane component may have a viscosity of from about 100 to about 1000 cs and a vinyl-in-oil content of from about 0.1% by weight to about 1.0% by weight.

The organopolysiloxane may be supplied in water as an aqueous emulsion and may be premixed with a catalyst, for example, a platinum catalyst. An exemplary organopolysiloxane formulation containing a silicone polymer of formula (I) is 400E adhesive silicone coating available from Wacker Silicone of Adrian, Mich. The 400E has a weight percent solids content of from about 52% to about 58% and a vinyl-in-oil content of from about 0.40% by weight to about 0.45% by weight and a viscosity of about 500 cs, and is supplied in an aqueous emulsion which further includes 40 ppm platinum catalyst based on the weight of the silicone. The silicone of the 400E emulsion is represented by formula (I) wherein each of $R^1$, $R^2$, $R^3$, $R^4$ and $R^5$ is a methyl radical, each of R and $R^6$ is randomly selected from a methyl radical and a vinyl radical, $n \geq 3$ and x is no greater than 0.999.

According to preferred embodiments of the present invention, the cured silicone release system of the coating composition polymer may comprise the reaction product of components comprising: a dialkyl-polysiloxane silicone oil substituted with at least one member of the group consisting of terminal vinyl groups and pendant vinyl groups; an alkylhydrogenpolysiloxane crosslinker; and a catalytically effective amount of a crosslinking catalyst. The components may be supplied in an aqueous coating formulation which may contain from about 10% by weight to about 20% by weight solids, for example, 14% by weight, based on the total weight of the coating formulation.

The silicone release system may comprise an anchoring or coupling agent, for example, and adhesion promoter component. Exemplary anchoring and coupling agents which may be used in the silicone release system to bind the release system to a substrate include organosilane or zircoaluminate agents as described in the publication *Silanes and other Coupling Agents*, K. L. Mittal Editor, VSP publisher (1992), which is herein incorporated by reference in its entirety. Particularly useful agents include those described in *Silanes and other Coupling Agents* (I.b.i.d.) at page 6, in Table 1 (organofunctional coupling agents), at page 24, in Table 1 (silanes), at pages 547 and 551 (zirconium-based coupling agents and adhesion promoters), and at pages 559 and 561 (zircoaluminate adhesion promoters), these cited pages being incorporated herein by reference in their entireties.

Other materials that may be incorporated in the silicone release agent include the silicone adhesion agents disclosed in U.S. Pat. No. 4,216,252 to Moeller which is herein incorporated by reference in its entirety. For example, U.S. Pat. No. 4,216,252 discloses that tetraalkyl titanate may be added to silicone compositions to improve adhesion of the composition.

The silicone release system may comprise an epoxy-substituted alkoxysilane, particularly in embodiments wherein the substrate comprises a polyester material. In embodiments wherein an epoxy-substituted alkoxysilane is included in the silicone system, the alkoxysilane may be gamma-(glycidoxypropyl)-trimethoxysilane, for example, Dow Corning's Z-6040. In embodiments of the invention wherein an epoxy-substituted alkoxysilane is included in the silicone release agent, the silane may be supplied as 100% by weight liquid silane, and may be present in the silicone release system in an amount of from about 0.1% by weight to about 1.0% by weight, for example, 0.5% by weight, based on the total weight of reactants in the silicone release system. Other anchoring agents, coupling agents or linking agents may be used and include other silanes and the Dow Corning product SYL-OFF 297.

If used alone as a release coating, the silicone release component or system of the present invention may provide a release force of from about 10 gm/in to about 25 gm/in when TESA 7475 test tape is released after one-day aging at a pull rate of 12 inches per minute.

According to embodiments of the present invention, the crosslinker preferably has the formula (II) shown below:

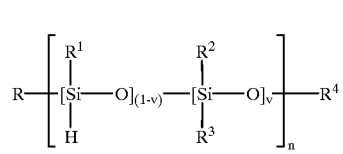

(II)

wherein each of R, $R^1$, $R^2$, $R^3$ and $R^4$ is an organic group, $n \geq 3$ and v is from about 0.1 to about 1.0, preferably from about 0.3 to about 0.7. According to some embodiments, at least one of R and $R^4$ is a vinyl radical. Each of R, $R^1$, $R^2$, $R^3$ and $R^4$ may be a radical selected from the following groups: alkyl, aryl, aralkyl, alkaryl, alkenyl, cycloalkyl, cycloalkenyl or phenyl. Exemplary of these substituents are methyl, ethyl, propyl, butyl, vinyl, allyl, tolyl, xylyl, benzyl, cyclohexyl, phenylethyl and naphthyl groups. Each of R, $R^1$, $R^2$, $R^3$ and $R^4$ may be a halo-substituted hydrocarbon radical, an amino-substituted hydrocarbon radical or a cyano-substituted hydrocarbon radical.

According to preferred embodiments of the present invention, each of R, $R^1$, $R^2$, $R^3$ and $R^4$ in formula (II) above is a hydrocarbon containing from 1 to 10 carbon atoms. Preferably, each of $R^1$, $R^2$ and $R^3$ is an alkyl or phenyl radical. According to some embodiments of the present invention, each of $R^1$, $R^2$ and $R^3$ is an alkyl radical containing from 1 to 3 carbon atoms and each of R and $R^4$ are hydrogen, alkyl or vinyl. Preferably, each of $R^1$, $R^2$ and $R^3$ is a methyl radical and each of R and $R^4$ are hydrogen, methyl or vinyl. According to some embodiments, the crosslinker is dimethylhydrogen terminated.

The crosslinker of formula (II) may have a hydrogen in oil content of from about 0.1 to about 0.5% by weight. The crosslinker may be supplied in an aqueous emulsion. An exemplary crosslinker of formula (II) is V-20 available from Wacker Silicone of Adrian, Mich. The V-20 has a hydrogen in oil content of from about 0.70% by weight to about 0.76% by weight, and is supplied in an aqueous emulsion. The crosslinker of the V-20 emulsion is represented by formula (II) wherein each of $R^1$, $R^2$ and $R^3$ are each a methyl radical, each of R and $R^4$ is randomly selected from a methyl radical and a hydrogen radical, and v=0.5.

According to yet another aspect of the invention, the release force required to separate a non-silicone adhesive from a release surface according to the invention can be varied depending upon the weight ratio of polyorganosiloxane in the silicone release agent to organohydrogensiloxane crosslinker. Generally, as the ratio of polyorganosiloxane to crosslinker increases, the force required to release an adhesive from the release surface increases substantially linearly. As the percent of crosslinker increases, the degree of crosslinking increases and the release force generally decreases substantially linearly. Polyorganosiloxane to crosslinker ratios of from about 1:1 to about 20:1 are preferred, for example, ratios of from about 7:1 to about 15:1.

According to embodiments of the present invention wherein the silicone release agent comprises a cross-linking catalyst, the catalyst preferably comprises platinum. Exemplary platinum catalysts are hexachloroplatinic acid and platinum tetrachloride. The crosslinking catalyst is present in a catalytically effective amount and may be present in an amount of from about 300 to about 1000 ppm based on the weight of the polyorganosiloxane of formula (I).

According to preferred embodiments of the invention, the silicone release component of the coating composition may be prepared by hydrolyzing a glycidoxy silane in deionized water and blending with an aqueous silicone resin emulsion and its corresponding crosslinker. If a glycidoxy silane is employed in the silicone release system, the glycidoxy silane aids in securely anchoring or holding the network to the substrate. The glycidoxy silane may be glycidoxypropyltrimethoxysilane or glycidoxypropylmethyldiethoxysilane, or generally any glycidoxy silane represented by the formula X—Y—Si—R$_1$R$_2$R$_3$, i.e.

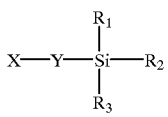

wherein X is a glycidoxy group, Y is an alkylene group, for example, methylene, ethylene, propylene, etc., R$_1$ and R$_2$ are hydrolyzable groups, for example, methoxy, ethoxy, acetoxy, and the like, and R$_3$ may be a hydrolyzable group or a non-hydrolyzable group. If R$_3$ is a non-hydrolyzable group, R$_3$ may be an alkyl group, for example, methyl, ethyl, and the like, or an aryl group, for example, phenyl, naphthyl, and the like. These silanes may possess water solubility or water dispersibility, as well as solvent solubility/dispersibility. A commercially available glycidoxypropyltrimethoxysilane which may be used in the present invention is Z6040 produced by Dow Corning.

An exemplary condensation polymerization reaction of a glycidoxy silane may be represented as follows:

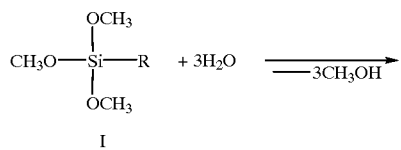

I

-continued

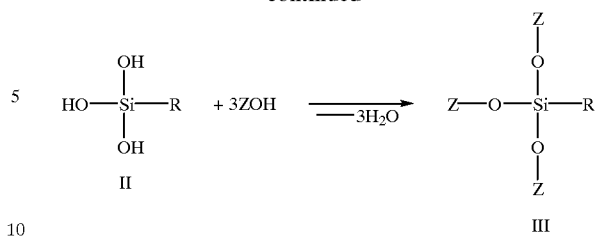

wherein R is a gamma-(glycidoxypropyl) group and Z is the condensed polymerization product of a silicone reactive monomer or polymer having at least one hydroxyl group that condenses with a hydroxyl group of monomer II. The epoxy group of the glycidoxy substituent bonds to the polyester surface of a polyester film substrate and also bonds to the cross-linked silicone release agent polymer system, holding the release agent system to the polyester surface.

Release agents comprising a glycidoxy silane may contain from about 5% by weight to about 20% by weight glycidoxy silane, based on the total weight of the silicone release polymer system. Less than about 5% by weight may not significantly improve rub-off of the silicone release polymer system, while more than 20% by weight may result in excessive stickiness, an increase in rub-off, and an increase in coefficient of friction.

The aqueous silicone resin composition may be platinum catalyzed, however, condensation type siloxanes may be employed and the emulsion may be catalyzed with a tin catalyst. The crosslinker employed should be that recommended by the particular silicone resin composition manufacturer for the specific aqueous silicone resin used.

Examples of aqueous based silicone resin compositions which may be employed as the release agent of the present release coating compositions are:

1) Dow Corning (Midland, Mich.) Syl-off X2-7720, or 7900, or 7910, aqueous silicone resin composition comprising methyl vinyl polysiloxane and methyl hydrogen polysiloxane with either the X2-7721 or 7922 crosslinking system comprising platinum polysiloxane;

2) G. E. Silicones (Schenectady, N.Y.) SM3200 aqueous silicon resin composition comprising methyl vinyl polysiloxane and methyl hydrogen polysiloxane with the 3010 crosslinking system comprising platinum polysiloxane.

3) Wacker Silicone (Adrian, Mich.) aqueous based 400E or 410E silicone resin compositions comprising methyl vinyl polysiloxane and platinum, with the V-20 crosslinking system comprising methyl hydrogen polysiloxane;

4) PCL (Rhone-Poulenc Inc., Rock Hill, S.C.) PC-105 aqueous based silicone resin composition comprising methyl vinyl polysiloxane and methyl hydrogen polysiloxane with the catalyst component of PC-95 comprising platinum polysiloxane;

5) PCL PC-107 (Rhone-Poulenc Inc.) aqueous based silicone resin composition (similar to PC 105) with the above-identified PC-95 crosslinker; and 6) PCL PC-188 (Rhone-Poulenc Inc.) aqueous based silicone resin composition (similar to PC 105) with the above-identified PC-95 crosslinker.

The glycidoxy silane may be a glycidoxypropyltrimethoxy-silane or generally any glycidoxysilane represented by the formula X—Y—Si—R1, R2, R3, wherein X is a glycidoxy group, Y is an alkylene group, for example, methylene, ethylene, propylene, etc., and R1, R2, and R3 are hydrolyzable groups, for example, methoxy, ethoxy, acetoxy, and the like. These silanes possess water solubility or water dispersibility.

The minimum amount of glycidoxy silane to be effective for an aqueous silicone resin composition in the present invention is about 1.0% by weight of the silicone solids. At a preferred coating solids level of about 5% by weight solids to about 15% by weight solids, the glycidoxy silane concentration in the emulsion is from about 0.5% to about 1.5%, by weight. On a dry weight basis, the glycidoxy silane preferably comprises from about 3% to about 30% of the silicone solids. Using much more than about 30% by weight of the glycidoxy silane on a dry weight basis is expensive and may not yield proportionally better results.

The amount of deionized water blended with the aqueous silicone resin composition is dependent upon the coating method and desired amount of solids, by weight, to be coated on the polyester film.

Without limiting the present invention by the application of any particular theory, it is believed that the reactive silicon-bonded hydroxy radicals and/or hydrolyzable radicals of the silicon compound that are not readily hydrolyzed during the formation of the aqueous silicon compound during emulsion, typically alkoxy radicals, provide sites for curing and/or crosslinking in the compositions of the present invention. These non-hydrolyzed radicals are believed to contribute to the unexpected properties of the present compositions in their ultimate use. Thus, after the aqueous, silicone release emulsion (A) has been mixed with the adhesion promoter (B), the reactive sites are thought to react with each other and/or with available reactive sites on the adhesion promoter monomer(s) and/or polymer(s), to provide a silicone-organic interpenetrating polymer network and in some cases a silicone-organic copolymer.

The solids level of the coating may be from about 3% to about 30% by weight solids. Preferably, the percent solids, by weight, is from about 5% to about 15%. While it may be possible that a solids concentration below 3% by weight for the coating may be effective, it is believed that such a level would be minimally effective. Additionally, while a solids level greater than 30% by weight may be effective, it is believed that at such a level a haze may result in the film, and the effectiveness of the coating does not linearly increase with the coating weight. In other words, a thicker coating is more expensive but not substantially more effective than a film having a solids level of about 30% or less.

The coating weight of the release coating composition may be from about 0.02 lb./ream to about 0.10 lb./ream. According to some embodiments of the invention, coating thicknesses of from about 750 angstroms to about 1500 angstroms are provided. Generally, a thickness less than the above amount is not effective as a release coating, while a thickness more than the above amount is not cost effective.

The thickness of the polymeric backing depends upon the desired application of the finished multi-layered product. When used as a release backing for an adhesive label, it is preferred that the backing including the release coating has a thickness of from about 0.25 mil to about 7 mils, with thicknesses in the range of from about 0.5 mil to about 3.0 mils being more preferred for some applications. The present invention can provide coated polymeric film liners that are much thinner than conventional paper liners which generally have thicknesses of 2.5 mils or greater. The coating composition may also be applied, for example, to a cardboard box inner surface or to other rigid substrates including substrates having thicknesses of greater than 1.0 mil.

The controlled release coating compositions of the present invention may be applied to a variety of substrates to form controlled release backings. Peelable and disposable release backings are preferred according to embodiments of the invention. The substrate or backing may comprise a polymeric material, a paper or cellulosic material, a rubber material such as a silicone or latex rubber, or a fabric material. According to embodiments of the invention, the substrate or backing is thin. Preferably, the backing is flexible.

According to some embodiments, the coating composition of the invention is applied to a surface which is not thin and flexible, such that a release surface is formed rather than a peelable backing. According to some embodiments of the invention, a release surface is formed on a rigid surface comprising, for example, rigid plastic, metal or rigid cardboard.

The present invention may be applicable to any polymeric film capable of acting as a substrate for the controlled release coating of the present invention. In particular, the present invention is applicable to polymeric films such as those made from polyamides exemplified by nylon; polyolefins such as polypropylene and polyethylene; polyester such as polyethylene terephthalate; polyacetal; polycarbonate; liquid crystal polymers including LCP-polyester and LCP-nylon; polyimides; and the like. Preferred substrate materials may comprise a polyester, for example, polyethylene terephthalate or polybutylene terephthalate. The substrate may comprise a copolyester, for example, polyethylene terephthalate-co-isophthalate. Generally, any polyester film based on a polymer resulting from the polycondensation of a glycol or diol with a dicarboxylic acid (or the ester equivalents) such as terephthalic acid, isophthalic acid, sebacic acid, malonic acid, adipic acid, azelaic acid, glutaric acid, suberic acid, succinic acid, and the like, or mixtures thereof, can be employed according to embodiments of the present invention. The glycol may be selected from ethylene glycol, diethylene glycol, polyethylene glycol, diols such as butanediol, and polyols such as glycerol, trimethylol propane, and mixtures thereof.

Any of the above polymeric films can contain conventional additives such as antioxidants, delusterants, pigments, fillers such as silica, calcium carbonate, kaolin, titanium dioxide, antistatic agents, etc., all of which are well known in the art.

According to embodiments of the invention, the polymeric film may comprise a polymeric laminate such as: a polymer-polymer laminate, for example, a polyester-polyolefin laminate; a polymer-metallic laminate, for example, a polyester-aluminum laminate; a polymeric-paper laminate; or the like.

According to preferred embodiments of the invention, the controlled release coating composition is applied to a thin, flexible, peelable and disposable substrate or backing, for example a thin polymeric film. A preferred polymeric film material is polyester, for example, polyethylene terephthalate. The polymeric film may be manufactured from various polyester resins. Polyethylene terephthalate, polytetramethylene terephthalate, polyethylene 2,6-naphthalate, and polyethylene-1,4-cyclohexylene dimethylene terephthalate are examples of homopolymers which may be employed in the practice of the present invention. Polyester copolymers may also be used. Possible copolyesters include polyethylene terephthalate/isophthalate, polyethylene terephthalate/adipate, polyethylene terephthalate/sebacate, and polyethylene terephthalate/sulpho-isophthalate. Polyethylene terephthalate homopolyester is preferred.

According to embodiments of the invention, a tentered polymeric film is used as the substrate for a controlled release backing, and the tentered film has a thickness of from about 40 to about 1000 gauge, with a thickness of from about 100 gauge to about 200 gauge being preferred for some applications.

Polyester films are preferred for the polymeric material layers of the invention because of their smoothness, strength, tear resistance and moisture barrier characteristics. According to a preferred embodiment of the invention, polyethylene terephthalate (PET) is a preferred film material, particularly oriented PET which has been stretched uniaxially or biaxially.

If polyester is used as the polymeric layer, the polyester film may also include other compatible polymers but preferably the film has a polyester content greater than about 85% by weight. A blend of polyester and polyamide, for example, a blend of polyethylene terephthalate and nylon, may be employed.

The substrate or backing for the controlled release coating may be produced by a technique known in the art. According to some embodiments of the invention, an extruded and tentered polyester film is a preferred substrate material.

As a preferred polymer, the manufacture of a silicone-coated oriented polyester film for the polymeric layer will now be described. It is to be understood that similar processes can be used to make coated polymeric layers comprising different polymers.

A preferred method of applying the coatings of the present invention, especially to a polymeric film, involves in-line coating a polymeric support, where the controlled release coating composition is applied during the manufacturing process. Under in-line coating conditions, a polymeric film may be (1) coated after corona treatment and prior to the stretch orientation of the film, (2) coated interdraw in those production methods in which a biaxially oriented film is employed, or (3) coated post draw. According to preferred embodiments of the invention, the heat required for tentering or stretching a polymeric film is sufficient to dry and/or cure an in-line coated controlled release composition according to the invention.

The oriented polyester film, whether uniaxially oriented or biaxially oriented, is generally heat-set at a temperature ranging from about 190° C. to about 240° C., preferably from about 215° C. to about 235° C. The coated oriented polyester film is then wound into a roll for further processing or shipping.

A polyester film used as a substrate according to embodiments of the present invention may be manufactured by an extrusion process. Polyester resin is first heated to a molten state and then extruded through a wide slot die in the form of an amorphous sheet. The sheet-like extrudate is rapidly cooled or quenched by extruding the amorphous sheet around a polished, revolving chilled casting drum, to form a cast sheet of polyester. The cast polyester sheet can then be stretched in one or more directions, while being heated to a temperature in the range of from about 80° C. to about 160° C., preferably of from about 90° C. to about 100° C. The degree of stretching may range from about three to five times the original cast sheet unit dimension. Preferably, the polyester film is biaxially oriented (stretched in both the machine direction and the transverse direction), rather than only uniaxially oriented.

Prior to coating the polyester film surface with the silicone coating, the film may be surface-treated in a conventional manner by exposure to an electric corona discharge. Electric corona discharge is a conventional surface treatment which is commonly performed on polyester films to enhance the wetting property of the film. Electric corona discharge methods and apparatus are described in U.S. Pat. Nos. 3,057,792 and 4,239,973, which are incorporated herein by reference. In embodiments of the invention, power levels which may be used prior to coating the polyester film with silicone may range from about 2 to about 8 watts per square foot per minute, for example from about 3 to about 5 watts per square foot per minute.

While surface modification of the polymeric substrate is not rigidly required, better results are obtained if the surface of the polymeric film is modified immediately before application of the coating composition of the present invention. Conventional well known surface modification techniques are known. Corona treatment of the film is a common and preferred procedure for modifying the surface of the polymeric substrate. The corona treatment, or other surface modification, is preferably sufficient to improve wetting-out of the controlled release coating composition.

For uniaxially oriented film formation, the corona treatment and application of the release coating composition may occur during the in-line manufacturing process, either before stretch orientation or after stretch orientation. If the corona treatment and coating application occurs before stretch orientation, heating the film before stretch orientation will usually drive off the water in the coating and promote curing, polymerizing, setting or drying of the release coating. The film should be completely dried before winding the film. Heat-setting the film to lock-in the physical properties is generally sufficient to dry the film before winding. For uniaxially oriented film, the preferred procedure is to corona treat and coat the film before stretch orientation.

For biaxially oriented film formation, the corona treatment and application of the release coating composition may occur during the in-line manufacturing process either before stretch orientation, between the machine draw and the transverse draw, or after biaxial orientation. It is preferred that the film be completely dry before winding. If the corona treatment or coating occurs before orientation, or between draws during orientation, the latter orientation steps are generally sufficient to drive off the water from the coating. Preferably, for biaxially oriented film formation, the corona treatment and subsequent coating occur between draws during the stretch orientation stage.

The polymeric layer, preferably a polyester sheet, is coated on the electric corona discharge treated surface with a controlled release composition according to embodiments of the present invention. The coating composition may conveniently be applied as an aqueous emulsion using any of the well known coating techniques. For example, roll coating, direct gravure roll coating, reverse gravure roll coating, roll brush coating, spray coating, air knife coating, slot coating, dipping, or meniscus coating may be employed. The heat applied to the film during the subsequent preheating, stretching and heat-setting stages is generally sufficient to evaporate the water and cure and bind the coating to the polyester film.

In addition to in-line coating, it has also been determined that the coating composition of the present invention may be off-line coated, preferably after conventional surface modification of the polymeric substrate has occurred. Thus, the process involves a plain polymeric substrate which is produced, rolled up and stored, and is later unrolled and off-line coated with a coating composition of the present invention, preferably after corona treating the film or after some other surface modification treatment. Off-line coating is not preferred, however, because the coating thickness is generally thicker and dust tends to be mixed in with the coating because off-line coating processes generally do not occur in clean environments. Dust is not a problem in in-line manufacturing processes which occur in a clean environment. Also, the heat required to dry and cure thicker off-line applied coatings necessitates temperatures and/or resonance times that require the off-line coating process to run at slow speed.

A second release coating composition which may be the same as or different than the controlled release coating composition may be applied to an opposite side of the substrate simultaneously with, before, or after application of the controlled release coating composition. According to embodiments of the invention, the second coating composition provides different release properties than the controlled release coating and is applied to the backside of the substrate, opposite a side of the substrate coated with the controlled release coating. Preferably, the second coating is applied during on-line coating of the substrate with the controlled release coating composition, and the resultant substrate, coated on both sides thereof, may then be tentered to form a stretched product having a release coating on both sides thereof. The double-coated substrate may be used, for example, as a disposable liner for a wound roll of double-sided adhesive tape.

The present invention is further illustrated by the following non-limiting examples wherein all parts, percentages and ratios are by weight, and all temperatures are in °C. unless otherwise indicated:

EXAMPLES 1–16

A controlled release coating composition was prepared, in-line coated onto an extruded polyester film substrate, and tested for releasability by (1) adhering a 7475 TESA test tape and measuring the force required to release the tape from the coating surface, and (2) adhering a Gelva one-inch wide adhesive strip to the surface to be tested, applying a polypropylene support for the adhesive, and measuring the force required to pull the adhesive from the tested release surface. The controlled release composition consisted of a blend of (1) a dispersion of a water-dispersible adhesion promoter, and (2) an emulsion of a water-emulsifiable cross-linkable silicone release agent. The water dispersible adhesion promoter consisted of prepolymerized linear copolyester comprising a copolyester component and a diol component at a 1:1 weight ratio in an aqueous dispersion. The copolyester component consisted of prepolymerized dimethylisophthalate and dimethyl-5-sulfoiso-phthalate sodium salt in a 9:1 respective weight ratio. The diol component consisted of ethylene glycol.

The emulsion of the water-emulsifiable cross-linkable silicone release agent consisted of about 14% by weight solids, wherein the solids comprised (1) a vinyl-containing dimethylpolysiloxane, (2) a methylhydrogenpolysiloxane crosslinker, (3) a gamma-(glycidoxypropyl) trimethoxysilane, and (4) a catalytic amount of a platinum catalyst. A coating of the silicone release agent alone would provide a release force of from about 10 gm/in to about 25 gm/in when tested with a TESA 7475 test tape after aging one day and pulled at a pull rate of about 12 inches per minute.

The relative amounts of each of components (1)–(3), based on the total weight of the solids, which made up the silicone release emulsions of Examples 1–16 are reported in Table I below. For each composition 40 ppm by weight of the platinum catalyst was present based on the weight of component (1).

The vinyl-containing dimethylpolysiloxane (component (1)) is represented by the formula:

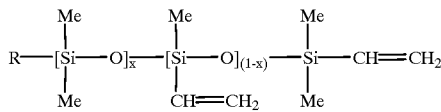

wherein each Me is a methyl group, R is randomly selected from methyl and vinyl radicals and x is greater than 0.999. The vinyl-in-oil content of component (1) is from about 0.40% by weight to about 0.45% by weight, and the viscosity is about 500 cs.

The methylhydrogenpolysiloxane crosslinker (component (2)) is represented by the formula:

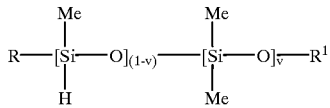

wherein each Me is a methyl group, R and $R^1$ are randomly selected from methyl and hydrogen radicals and v is 0.5. The hydrogen-in-oil content of component (2) is from about 0.70% by weight to about 0.76% by weight.

The gamma-(glycidoxypropyl)trimethoxysilane (component (3)) is available as a non-diluted 100% liquid composition from Dow Corning, Midland, Mich., under the tradename Z-6040.

The platinum catalyst (4) was premixed with the vinyl-containing dimethylpolysiloxane (component (1)) by the supplier and was present in an amount of about 40 ppm based on the weight of the vinyl-containing dimethylpolysiloxane (component (1)).

In each of Examples 1–16 the controlled release composition was in-line applied to a freshly extruded unfilled homopolymeric polyethylene terephthalate (PET) film substrate. The extruded PET film was cast around a chill roll and then uniaxially oriented or tentered to about 3.7 times its original, pretentered dimension in the machine direction before the coating formulation was applied in-line. Then, after the formulation was coated onto the uniaxially stretched substrate, the coated substrate was oriented or tentered to about 3.7 times its original, 14 inch, pretentered width dimension in the transverse direction. The resulting biaxially stretched PET film had a thickness of about 142 gauge and the controlled release coating on the biaxially stretched film substrate had a thickness of from about 1000 angstroms to about 2000 angstroms. The line speed of the film substrate during coating each of Examples 1–16 was 145 feet per minute.

Prior to applying the release coating composition, the surface of the uniaxially oriented film substrate was corona discharge treated at a rate of about 5.5 watts per square foot per minute. The meniscus width of the coating composition applied to the 14 inch wide uniaxially stretched substrate film was 12.25 inches.

For each of the emulsions of Examples 1–16, the formulation comprised a fluid consisting of a microscopically heterogeneous mixture of the coating composition suspended in deionized water. Proprietary emulsifiers had been previously incorporated into the emulsions by the respective suppliers. Some of the emulsions were diluted with deionized water to obtain lower solids contents.

The weight ratio of the adhesion promoter to the silicone release agent, based on the weight of the solids, is shown in Tables I and II below. Also shown in Tables I and II are the total solids content of the coating emulsion blend, the weight percent of the gamma-(glycidoxypropyl)trimethoxysilane, the ratio of vinyl-containing dimethylpolysiloxane to methylhydrogen-polysiloxane crosslinker in the silicone release agent, the wet and dry laydown amounts, and the average (of three) release force measurements for each of Examples 1–16 taken after one day and after one week. The release forces reported for Examples 1–16 in Table I were tested at room temperature. The release forces reported for Examples 1–16 in Table II were tested under Kiel conditions at 140° C.

The test tape used to measure the release forces reported in Tables I and II was a one inch wide TESA 7475 acrylic adhesive test tape which was pulled at a rate of 12 inches per minute. The test tape used to measure the release forces reported in Tables III and IV was a one-inch wide Gelva 1753 adhesive strip which was pulled at a rate of 12 inches per minute. All of the release forces reported in Tables I–IV were measured with an Instron model 4466 measuring device.

The hyphens (-) shown in Tables I–IV indicate that data was either unavailable, not recorded, or could not otherwise be obtained, for example, the dry laydown in Example 10.

TABLE I

TESA 7475 Test Tape

| EXAMPLE | RATIO OF ADHESION PROMOTER TO SILICONE RELEASE AGENT | TOTAL SOLIDS CONTENT IN COATING FORMULA (% by wt.) | Z-6040 EPOXY (% by wt.) | RATIO OF VINYL-CNTG DIMETHYL-POLYSILOXANE TO METHYL-HYDROGEN POLYSILOXANE | WET LAY-DOWN IN lbs/ft$^2$ | DRY LAY-DOWN IN mg/m$^2$ | RELEASE FORCE AFTER AGING 1 DAY @ ROOM TEMP. | RELEASE FORCE AFTER AGING 1 WEEK @ ROOM TEMP. | RELEASE FORCE AFTER AGING 3 WEEK @ ROOM TEMP. |
|---|---|---|---|---|---|---|---|---|---|
| 1 | 3:1 | 7 | 0.25 | 4:1 | 0.63 | 57 | 283 | 277 | — |
| 2 | 8:1 | 7 | 0.25 | 4:1 | 0.64 | 58 | 543 | 473 | 642 |
| 3 | 3:1 | 12 | 0.25 | 4:1 | 0.45 | 69 | 160 | 123 | 180 |
| 4 | 8:1 | 12 | 0.25 | 4:1 | 1.14 | 176 | 412 | 390 | 577 |
| 5 | 3:1 | 7 | 0.5 | 4:1 | 0.65 | 58 | 197 | 223 | 292 |
| 6 | 8:1 | 7 | 0.5 | 4:1 | 0.62 | 56 | 333 | 303 | 423 |
| 7 | 3:1 | 12 | 0.5 | 4:1 | 0.52 | 80 | 97 | 85 | 137 |
| 8 | 8:1 | 12 | 0.5 | 4:1 | 0.65 | 100 | 333 | 337 | 450 |
| 9 | 3:1 | 7 | 0.25 | 6:1 | 0.53 | 48 | 510 | 450 | 620 |
| 10 | 8:1 | 7 | 0.25 | 6:1 | — | — | 473 | 460 | 650 |
| 11 | 3:1 | 12 | 0.25 | 6:1 | 0.51 | 77 | 265 | 268 | 377 |
| 12 | 8:1 | 12 | 0.25 | 6:1 | 0.82 | 126 | 517 | 503 | 727 |
| 13 | 3:1 | 7 | 0.5 | 6:1 | 0.44 | 40 | 433 | 438 | 633 |
| 14 | 8:1 | 7 | 0.5 | 6:1 | 0.82 | 74 | 610 | 587 | 833 |
| 15 | 3:1 | 12 | 0.5 | 6:1 | 0.65 | 100 | 273 | 263 | 393 |
| 16 | 8:1 | 12 | 0.5 | 6:1 | 0.51 | 79 | 597 | 600 | 850 |

TABLE II

TESA 7475 Test Tape

| EXAMPLE | RATIO OF ADHESION PROMOTER TO SILICONE RELEASE AGENT | TOTAL SOLIDS CONTENT IN COATING FORMULA (% by wt.) | Z-6040 EPOXY (% by wt.) | RATIO OF VINYL-CNTG DIMETHYL-POLYSILOXANE TO METHYL-HYDROGEN POLYSILOXANE | WET LAY-DOWN IN lbs/ft$^2$ | DRY LAY-DOWN IN mg/m$^2$ | RELEASE FORCE AFTER AGING 1 DAY @ 140° C. | RELEASE FORCE AFTER AGING 1 WEEK @ 140° C. | RELEASE FORCE AFTER AGING 3 WEEK @ 140° C. |
|---|---|---|---|---|---|---|---|---|---|
| 1 | 3:1 | 7 | 0.25 | 4:1 | 0.63 | 57 | 217 | 397 | 483 |
| 2 | 8:1 | 7 | 0.25 | 4:1 | 0.64 | 58 | 583 | 720 | 1000 |
| 3 | 3:1 | 12 | 0.25 | 4:1 | 0.45 | 69 | 133 | 97 | 273 |
| 4 | 8:1 | 12 | 0.25 | 4:1 | 1.14 | 176 | 387 | 375 | 1000 |
| 5 | 3:1 | 7 | 0.5 | 4:1 | 0.65 | 58 | 163 | 343 | 750 |
| 6 | 8:1 | 7 | 0.5 | 4:1 | 0.62 | 56 | 260 | 397 | 600 |
| 7 | 3:1 | 12 | 0.5 | 4:1 | 0.52 | 80 | 110 | 167 | 260 |
| 8 | 8:1 | 12 | 0.5 | 4:1 | 0.65 | 100 | 303 | 463 | 600 |
| 9 | 3:1 | 7 | 0.25 | 6:1 | 0.53 | 48 | 360 | 533 | 817 |
| 10 | 8:1 | 7 | 0.25 | 6:1 | — | — | 370 | 593 | 683 |
| 11 | 3:1 | 12 | 0.25 | 6:1 | 0.51 | 77 | 197 | 357 | 767 |
| 12 | 8:1 | 12 | 0.25 | 6:1 | 0.82 | 126 | 413 | 667 | 983 |
| 13 | 3:1 | 7 | 0.5 | 6:1 | 0.44 | 40 | 390 | 577 | 800 |
| 14 | 8:1 | 7 | 0.5 | 6:1 | 0.82 | 74 | 510 | 783 | 1000 |
| 15 | 3:1 | 12 | 0.5 | 6:1 | 0.65 | 100 | 167 | 300 | 350 |
| 16 | 8:1 | 12 | 0.5 | 6:1 | 0.51 | 79 | 517 | 783 | 1100 |

TABLE III

Gelva 1753 one-inch Adhesive Strip

| EXAMPLE | RATIO OF ADHESION PROMOTER TO SILICONE RELEASE AGENT | TOTAL SOLIDS CONTENT IN COATING FORMULA (% by wt.) | Z-6040 EPOXY (% by wt.) | RATIO OF VINYL-CNTG DIMETHYL-POLYSILOXANE TO METHYL-HYDROGEN POLYSILOXANE | WET LAY-DOWN IN lbs/ft$^2$ | DRY LAY-DOWN IN mg/m$^2$ | RELEASE FORCE AFTER AGING 1 DAY @ ROOM TEMP. | RELEASE FORCE AFTER AGING 1 WEEK @ ROOM TEMP. | RELEASE FORCE AFTER AGING 3 WEEK @ ROOM TEMP. |
|---|---|---|---|---|---|---|---|---|---|
| 1 | 3:1 | 7 | 0.25 | 4:1 | 0.63 | 57 | 433 | 397 | 417 |
| 2 | 8:1 | 7 | 0.25 | 4:1 | 0.64 | 58 | 280 | 520 | 443 |
| 3 | 3:1 | 12 | 0.25 | 4:1 | 0.45 | 69 | 170 | 140 | 190 |
| 4 | 8:1 | 12 | 0.25 | 4:1 | 1.14 | 176 | 267 | 507 | 583 |
| 5 | 3:1 | 7 | 0.5 | 4:1 | 0.65 | 58 | 163 | 173 | 173 |
| 6 | 8:1 | 7 | 0.5 | 4:1 | 0.62 | 56 | 190 | 410 | 267 |
| 7 | 3:1 | 12 | 0.5 | 4:1 | 0.52 | 80 | 70 | 163 | 107 |
| 8 | 8:1 | 12 | 0.5 | 4:1 | 0.65 | 100 | 243 | 400 | 483 |
| 9 | 3:1 | 7 | 0.25 | 6:1 | 0.53 | 48 | 637 | 570 | 470 |
| 10 | 8:1 | 7 | 0.25 | 6:1 | — | — | 200 | 347 | 167 |
| 11 | 3:1 | 12 | 0.25 | 6:1 | 0.51 | 77 | 163 | 353 | 300 |
| 12 | 8:1 | 12 | 0.25 | 6:1 | 0.82 | 126 | 230 | 500 | 350 |
| 13 | 3:1 | 7 | 0.5 | 6:1 | 0.44 | 40 | 483 | 440 | 425 |
| 14 | 8:1 | 7 | 0.5 | 6:1 | 0.82 | 74 | 608 | 540 | 533 |
| 15 | 3:1 | 12 | 0.5 | 6:1 | 0.65 | 100 | 257 | 267 | 260 |
| 16 | 8:1 | 12 | 0.5 | 6:1 | 0.51 | 79 | 533 | 450 | 510 |

TABLE IV

Gelva 1753 one-inch Adhesive Strip

| EXAMPLE | RATIO OF ADHESION PROMOTER TO SILICONE RELEASE AGENT | TOTAL SOLIDS CONTENT IN COATING FORMULA (% by wt.) | Z-6040 EPOXY (% by wt.) | RATIO OF VINYL-CNTG DIMETHYL-POLYSILOXANE TO METHYL-HYDROGEN POLYSILOXANE | WET LAY-DOWN IN lbs/ft$^2$ | DRY LAY-DOWN IN mg/m$^2$ | RELEASE FORCE AFTER AGING 1 DAY @ 140° C. | RELEASE FORCE AFTER AGING 1 WEEK @ 140° C. | RELEASE FORCE AFTER AGING 3 WEEK @ 140° C. |
|---|---|---|---|---|---|---|---|---|---|
| 1 | 3:1 | 7 | 0.25 | 4:1 | 0.63 | 57 | 183 | 407 | 700 |
| 2 | 8:1 | 7 | 0.25 | 4:1 | 0.64 | 58 | 417 | 1333 | 1433 |
| 3 | 3:1 | 12 | 0.25 | 4:1 | 0.45 | 69 | 193 | 253 | 145 |
| 4 | 8:1 | 12 | 0.25 | 4:1 | 1.14 | 176 | 373 | 1210 | 883 |
| 5 | 3:1 | 7 | 0.5 | 4:1 | 0.65 | 58 | 347 | 473 | 293 |
| 6 | 8:1 | 7 | 0.5 | 4:1 | 0.62 | 56 | 267 | 410 | 600 |
| 7 | 3:1 | 12 | 0.5 | 4:1 | 0.52 | 80 | 63 | 140 | 140 |
| 8 | 8:1 | 12 | 0.5 | 4:1 | 0.65 | 100 | 567 | 1000 | 683 |
| 9 | 3:1 | 7 | 0.25 | 6:1 | 0.53 | 48 | 437 | 593 | 750 |
| 10 | 8:1 | 7 | 0.25 | 6:1 | — | — | 257 | 493 | 1317 |
| 11 | 3:1 | 12 | 0.25 | 6:1 | 0.51 | 77 | 223 | 1140 | 1050 |
| 12 | 8:1 | 12 | 0.25 | 6:1 | 0.82 | 126 | 260 | 1067 | 583 |
| 13 | 3:1 | 7 | 0.5 | 6:1 | 0.44 | 40 | 450 | 927 | 600 |
| 14 | 8:1 | 7 | 0.5 | 6:1 | 0.82 | 74 | 427 | 653 | 800 |
| 15 | 3:1 | 12 | 0.5 | 6:1 | 0.65 | 100 | 190 | 437 | 410 |
| 16 | 8:1 | 12 | 0.5 | 6:1 | 0.51 | 79 | 327 | 637 | 917 |

Figure 2:
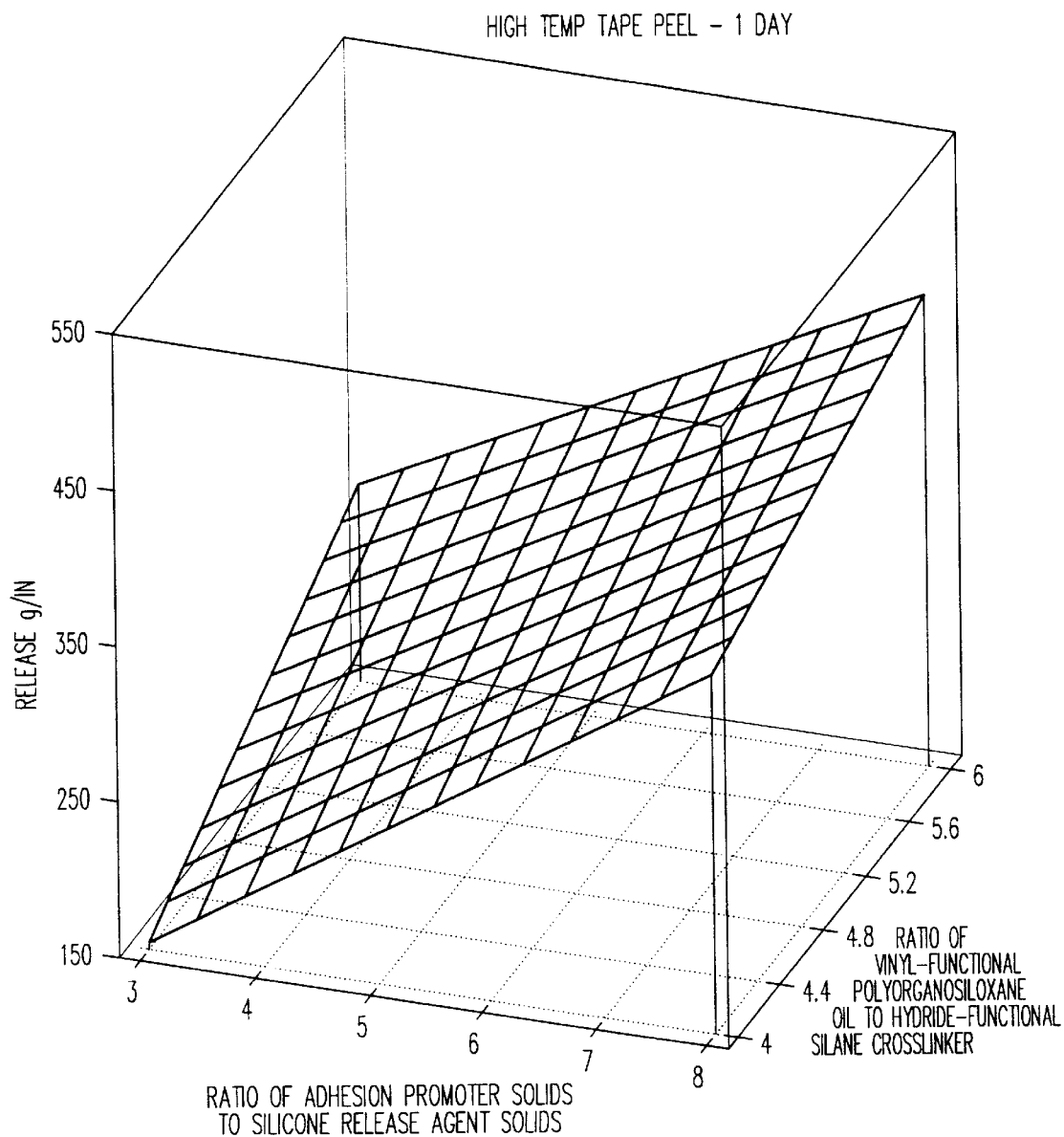
FIG. 2 is a three-dimensional graph showing (1) the release force required to peel TESA 7475 adhesive test tape from release backings made according to the invention, wherein ambient peeling occurred after one-day aging under ambient temperature conditions, (2) the relationship between release force and the weight ratio of adhesion promoter to release agent, and (3) the relationship between release force and the weight ratio of vinyl-functional polyorganosiloxane oil to hydride-functional silicone crosslinker in the release agent.

A best-fit plot of the results reported in Table I is shown in FIG. 1. A best-fit plot of the results reported in Table II is shown in FIG. 2. As can be seen from Tables I and II, and from FIGS. 1 and 2, the present invention provides a composition which can be used to make a series of controlled release surfaces exhibiting a substantially linear correlation between the release force and the ratio of adhesion promoter to silicone release agent. The data reported has very little standard deviation from the best-fit plane. The present invention also provides a series of controlled release backings wherein the related series of backings exhibits a progressive increase in force required to release a test tape therefrom. Release forces of from below 100 g/in to above 600 g/in are achieved after one-day aging at room temperature by varying the ratio of adhesion promoter to release agent in the formulations and/or by varying the ratio of vinyl-containing dimethylpolysiloxane to methylhydrogenpolysiloxane crosslinker in the release agent (Table I). Release forces of from about 150 g/in to about 500 g/in are achieved after one-day aging at 140° C. by varying the ratio of adhesion promoter to release agent in the formulations and/or by varying the ratio of vinyl-containing dimethylpolysiloxane to methylhydrogenpolysiloxane crosslinker in the release agent (Table II).

The results for Examples 1–16 reported in Tables I and II show that the controlled release backings of the present invention age well and perform consistently well at room temperature and at 140° C.

Similarly, the results reported in Tables III and IV for release of Examples 1–16 from the Gelva one-inch adhesive also indicate that the controlled release backings of embodiments of the invention age well and perform consistently well at room temperature and at 140° C.

EXAMPLES 17–23

Coating compositions consisting of the same adhesion promoter and silicone release agent as used in Examples 1–16 were formulated at adhesion promoter to silicone release agent weight ratios of 2:1, 0.2:1 and 0.5:1, in Examples 17–19. Coating compositions consisting of the same silicone release agent as used in Examples 1–16, but employing different adhesion promoters, were tested in Examples 20–23.

As in Examples 1–16, the adhesion promoter used in Examples 17–19 consisted of an aqueous emulsion of prepolymerized linear copolyester comprising a copolyester component and a diol component at a 1:1 weight ratio, with the copolyester component consisting of prepolymerized dimethylisophthalate and dimethyl-5-sulfoisophthalate sodium salt in a 9:1 respective weight ratio, and with the diol component consisting of ethylene glycol.

In Example 20, the adhesion promoter consisted of a polymerization product of N-(2-aminoethyl)-3-aminopropyltrimethoxysilane, that is, the polymerization product of Z-6020 available from Dow Chemical Company, Midland, Mich. The Z-6020 precursor is hydrolyzed at room temperature in the coating formulation via a hydrolysis reaction with water available from the aqueous emulsion in which it is dispersed. After coating onto a substrate, the Z-6020 precursor is polymerized via a subsequent condensation reaction of the hydrolyzed Z-6020 monomer. Although partial polymerization of the Z-6020 monomer may occur while dispersed in the aqueous emulsion, substantial completion of polymerization occurs after the coating composition is applied to a substrate and heated, for example, during tentering of a coated film substrate.

In Example 21, the adhesion promoter consisted of a prepolymerized linear copolyester comprising a copolyester component and a diol component at a 1:1 weight ratio dispersed in an aqueous emulsion. The copolyester component consisted of prepolymerized dimethylisophthalate and dimethyl-5-sulfoisophthalate sodium salt in a 9:1 respective weight ratio. The diol component consisted of polyethylene glycol.

In Example 22, the adhesion promoter consisted of 80% by weight of a component (A) and 20% by weight of a component (B). Component (A) consisted of a prepolymer of about 47.5% by weight methyl methacrylate, about 47.5% by weight ethyl acrylate, and about 5% by weight methacrylamide, and component (B) consisted of about 20% by weight hexamethoxymethyl melamine available as CYMEL 385 from Rohm & Haas Corporation, Philadelphia, Pa. The adhesion promoter also comprised an alkaline pH adjusting agent which is used to prevent polymerization of the component (B) with the monomers of component (A) until heating and drying of the coating composition.

In Example 23, the adhesion promoter consisted of a prepolymerized composition of about 60% by weight methyl methacrylate, about 35% by weight ethyl acrylate, and about 5% by weight N-methylolacrylamide. Although the composition is prepolymerized, crosslinking occurred during heating and drying of the coating composition.

In each of Examples 17–23, the release agent system consisted of the same silicone release agent components that were used in Examples 1–16, but at different ratios of vinyl-containing dimethylpolysiloxane (component (1)) to methyl-hydrogenpolysiloxane (component (2)). In each of the coating compositions of Examples 17–23 the silicone release agent comprised about 0.5% by weight of the Z-6040 epoxy silane. For each coating composition in Examples 17–23, a catalytic amount of the platinum catalyst (component (d)) was added, typically about 400 ppm, to catalyze crosslinking of the silicone release agent system.

For each of the emulsions of Examples 17–23, the formulation comprised a fluid consisting of a microscopically heterogeneous mixture of the coating polymer suspended in deionized water. Proprietary emulsifiers had been previously incorporated into the emulsions by the respective suppliers. Some of the emulsions were diluted with deionized water to obtain lower solids contents.

The controlled release compositions in Examples 17–23 were in-line applied to freshly extruded unfilled homopolymeric polyethylene terephthalate (PET) film substrates. For each of Examples 17–23, The extruded PET film was cast around a chill roll and then uniaxially oriented or tentered to about 3.7 times its original, pretentered dimension in the machine direction before the coating formulation was applied in-line. Then, after the formulation was coated onto the uniaxially stretched substrate, the coated substrate was oriented or tentered to about 3.7 times its original, pretentered 14 inch width dimension in the transverse direction. The resulting biaxially stretched PET film had a thickness of about 142 gauge and the controlled release coating on the biaxially stretched film substrate had a thickness of from about 1000 angstroms to about 2000 angstroms. The line speed of the film substrate during coating each of Examples 17–23 was 145 feet per minute. Prior to applying the release coating composition, the surface of the uniaxially oriented film substrate was corona discharge treated at a rate of about 5.5 watts per square foot per minute. The meniscus width of the coating composition applied to the uniaxially stretched 14 inch wide substrate film was 12.25 inches.

The weight ratio of the adhesion promoter to the silicone release agent for Examples 17–23, based on the weight of the solids, is shown in Tables V–VIII below, as is the total solids content of the coating emulsion blend, the ratio of vinyl-containing dimethylpolysiloxane to methylhydrogen-polysiloxane crosslinker in the silicone release agent, the wet laydown amounts, and the average (of three) release force measurements for each of Examples 17–23 taken after one day and after one week. The release forces reported for Examples 17–23 in Table V and VII were tested at room temperature. The release forces reported for Examples 17–23 in Tables VI and VIII were tested at 140° C. In each of Examples 17–23 the dry laydown coat weight, although neither measured nor recorded, was within the range of from about 126 dry mg/m$^2$ to about 241 dry mg/M$^2$.

The test tape used to measure the release forces reported in Tables V and VI was a one inch wide TESA 7475 acrylic adhesive test tape pulled at a pull rate of about 12 inches per minute. The release force was measured with an Instron model 4466 measuring device. The test tape used to measure the release forces reported in Tables VII and VIII was a one inch wide Gelva 1753 adhesive strip. The Gelva 1753 glue was mixed via standard chemistry laboratory procedure. The Gelva adhesive was applied with a #32 Meyer rod to the coated films of the Examples. The Example films then transferred the adhesive to the surface of a laminated polypropylene sheet. All Gelva 1753 1-inch sample testing reported in Table VII and VIII was conducted at a pull angle of 180° and a rate of 12 inches per minute using method D-5918 and the Instron model 4466 measuring device.

Results reported as "-" are for samples wherein results were not available or the test was not conducted.

TABLE V

TESA 7475 Test Tape

| EXAMPLE | RATIO OF ADHESION PROMOTER TO SILICONE RELEASE AGENT | TOTAL SOLIDS CONTENT IN COATING FORMULA (% by wt.) | Z-6040 EPOXY (% by wt.) | RATIO OF VINYL-CNTG DIMETHYL-POLYSILOXANE TO METHYL-HYDROGEN POLYSILOXANE | WET LAY-DOWN IN lbs/ft$^2$ | RELEASE FORCE AFTER AGING 1 DAY @ ROOM TEMP. | RELEASE FORCE AFTER AGING 1 WEEK @ ROOM TEMP. |
|---|---|---|---|---|---|---|---|
| 17 | 2:1   | 14 | 0.5 | 5.5:1 | 0.63 | 165.3 | 97.1 |
| 18 | 0.2:1 | 12 | 0.5 | 5.5:1 | 0.64 | 237.7 | 134.9 |
| 19 | 0.5:1 | 12 | 0.5 | 5.5:1 | 0.45 | 208.9 | 119.6 |
| 20 | 0.2:1 | 12 | 0.5 | 5.5:1 | 1.14 | —     | 21.4 |
| 21 | 0.2:1 | 12 | 0.5 | 5.5:1 | 0.65 | —     | 374.8 |
| 22 | 0.2:1 | 12 | 0.5 | 5.5:1 | 0.62 | —     | 27.4 |
| 23 | 0.2:1 | 12 | 0.5 | 5.5:1 | 0.52 | —     | 52.7 |

TABLE VI

TESA 7475 Test Tape

| EXAMPLE | RATIO OF ADHESION PROMOTER TO SILICONE RELEASE AGENT | TOTAL SOLIDS CONTENT IN COATING FORMULA (% by wt.) | Z-6040 EPOXY (% by wt.) | RATIO OF VINYL-CNTG DIMETHYL-POLYSILOXANE TO METHYL-HYDROGEN POLYSILOXANE | WET LAY-DOWN IN lbs/ft$^2$ | RELEASE FORCE AFTER AGING 1 DAY @ 140° C. | RELEASE FORCE AFTER AGING 1 WEEK @ 140° C. |
|---|---|---|---|---|---|---|---|
| 17 | 2:1   | 14 | 0.5 | 5.5:1 | 0.63 | 324  | — |
| 18 | 0.2:1 | 12 | 0.5 | 5.5:1 | 0.64 | 281  | — |
| 19 | 0.5:1 | 12 | 0.5 | 5.5:1 | 0.45 | 381  | — |
| 20 | 0.2:1 | 12 | 0.5 | 5.5:1 | 1.14 | 218  | — |
| 21 | 0.2:1 | 12 | 0.5 | 5.5:1 | 0.65 | 1180 | — |
| 22 | 0.2:1 | 12 | 0.5 | 5.5:1 | 0.62 | 308  | — |
| 23 | 0.2:1 | 12 | 0.5 | 5.5:1 | 0.52 | 214  | — |

TABLE VII

Gelva 1753 one-inch Adhesive Strip

| EXAMPLE | RATIO OF ADHESION PROMOTER TO SILICONE RELEASE AGENT | TOTAL SOLIDS CONTENT IN COATING FORMULA (% by wt.) | Z-6040 EPOXY (% by wt.) | RATIO OF VINYL-CNTG DIMETHYL-POLYSILOXANE TO METHYL-HYDROGEN POLYSILOXANE | WET LAY-DOWN IN lbs/ft$^2$ | RELEASE FORCE AFTER AGING 1 DAY @ ROOM TEMP. | RELEASE FORCE AFTER AGING 1 WEEK @ ROOM TEMP. |
|---|---|---|---|---|---|---|---|
| 17 | 2:1   | 14 | 0.5 | 5.5:1 | 0.63 | 58 | 108 |
| 18 | 0.2:1 | 12 | 0.5 | 5.5:1 | 0.64 | 73 | 47 |
| 19 | 0.5:1 | 12 | 0.5 | 5.5:1 | 0.45 | 59 | 92 |
| 20 | 0.2:1 | 12 | 0.5 | 5.5:1 | 1.14 | —  | 50 |
| 21 | 0.2:1 | 12 | 0.5 | 5.5:1 | 0.65 | —  | 608 |
| 22 | 0.2:1 | 12 | 0.5 | 5.5:1 | 0.62 | —  | 26 |
| 23 | 0.2:1 | 12 | 0.5 | 5.5:1 | 0.52 | —  | 50 |

TABLE VIII

Gelva 1753 one-inch Adhesive Strip

| EXAMPLE | RATIO OF ADHESION PROMOTER TO SILICONE RELEASE AGENT | TOTAL SOLIDS CONTENT IN COATING FORMULA (% by wt.) | Z-6040 EPOXY (% by wt.) | RATIO OF VINYL-CNTG DIMETHYL-POLYSILOXANE TO METHYL-HYDROGEN POLYSILOXANE | WET LAY-DOWN IN lbs/ft$^2$ | RELEASE FORCE AFTER AGING 1 DAY @ 140° C. | RELEASE FORCE AFTER AGING 1 WEEK @ 140° C. |
|---|---|---|---|---|---|---|---|
| 17 | 2:1   | 14 | 0.5 | 5.5:1 | 0.63 | 42 | 60 |
| 18 | 0.2:1 | 12 | 0.5 | 5.5:1 | 0.64 | 34 | 26 |

TABLE VIII-continued

Gelva 1753 one-inch Adhesive Strip

| EXAMPLE | RATIO OF ADHESION PROMOTER TO SILICONE RELEASE AGENT | TOTAL SOLIDS CONTENT IN COATING FORMULA (% by wt.) | Z-6040 EPOXY (% by wt.) | RATIO OF VINYL-CNTG DIMETHYL-POLYSILOXANE TO METHYL-HYDROGEN POLYSILOXANE | WET LAY-DOWN IN lbs/ft$^2$ | RELEASE FORCE AFTER AGING 1 DAY @ 140° C. | RELEASE FORCE AFTER AGING 1 WEEK @ 140° C. |
|---|---|---|---|---|---|---|---|
| 19 | 0.5:1 | 12 | 0.5 | 5.5:1 | 0.45 | 32 | 24 |
| 20 | 0.2:1 | 12 | 0.5 | 5.5:1 | 1.14 | — | 681 |
| 21 | 0.2:1 | 12 | 0.5 | 5.5:1 | 0.65 | — | 487 |
| 22 | 0.2:1 | 12 | 0.5 | 5.5:1 | 0.62 | — | 20 |
| 23 | 0.2:1 | 12 | 0.5 | 5.5:1 | 0.52 | — | 45 |

For Examples 20 and 21, which were pulled after one week aging at room temperature and reported in Table V, the Examples had a significant amount of backside transfer. The release of the Example 20 and 21 surfaces was then tested immediately after adherence of another piece of the 7475 test tape to other samples of the Example 20 and 21 surfaces. The average immediate release (no aging) of the Example 20 sample was 60 gm/in and the average immediate release of the Example 21 sample was 349 gm/in.

The foregoing results indicate that controlled release compositions according to embodiments of the present invention represented by Examples 1–23 exhibit consistent releasability over time, under room temperature conditions and under Kiel conditions (140° C.). The results indicate that there is little, if any, blooming of either the adhesion promoter component or the silicone release agent of the present compositions.

COMPARATIVE EXAMPLES 1–12

Twelve comparative examples were prepared for release testing. The comparatives consisted of compositions of six different adhesion promoters each mixed with a silicone release agent in a 2:1 dry solids weight ratio (Comparative Examples 1–6) and in a 3:1 dry solids weight ratio (Comparative Examples 7–12).

Comparative Examples 1 and 7 involved coating compositions consisting of a blend of adhesion promoter and silicone release agent wherein the adhesion promoter comprised an acrylic copolymer supplied as an aqueous emulsion of acrylic copolymer having a copolymer content of about 25% by weight, a water content of about 75% by weight, and a maximum of about 0.1% by weight residual monomers. The emulsion had a boiling point of about 100° C., a specific gravity of about 1.1, and a pH of from about 2 to about 3.

Comparative Examples 2 and 8 involved compositions wherein the adhesion promoter comprised an acrylic copolymer dispersed in water, which is a free-flowing liquid having less than 600 ppm formaldehyde, a boiling point of 212° F., a specific gravity of 1.1, a volatiles content of 70% by weight, a viscosity of less than 200 cps, and a pH of from about 9.0 to about 9.5.

Comparative Examples 3 and 9 involved compositions wherein the adhesion promoter comprised about 99% by weight gamma-glycidoxypropyl trimethoxysilane and less than about 2% by weight methyl alcohol. The adhesion promoter was commercially available as Z-6040 Silane from Dow-Corning Corporation, Midland, Mich.

Comparative Examples 4 and 10 involved compositions wherein the adhesion promoter comprised about 81% by weight N-(2-aminoethyl)-3-aminopropyltrimethoxysilane, about 18% by weight unidentified impurities including methyl alcohol, and about 0.7% by weight ethylenediamine. The adhesion promoter was commercially available as Z-6020(R) Silane from Dow-Corning Corporation, Midland, Mich.

Comparative Examples 5 and 11 involved compositions wherein the adhesion promoter comprised an aqueous dispersion of a low softening point polyamide resin available as Micromid® 321RC from Union Camp Corporation, Lawrenceville, N.J. The dispersion has a polyamide resin content of about 39% by weight, an emulsifier content of less than about 3% by weight, a pH of about 9.4, a Brookfield viscosity of less than about 500 cps at 25° C. using a #2 LVT Spindle, and an isopropanol content of about 50 g/L. The resin has a base resin softening point, tested with a ring and ball, of about 105° C., and an average particle size of less than about 300 nm.

Comparative Examples 6 and 12 involved compositions wherein the adhesion promoter comprised an aqueous acrylic emulsion available as RHOPLEX® 3208 Emulsion from Rhom & Haas, Philadelphia, Pa. Rhoplex® 3208 aqueous acrylic emulsion comprises from about 34% by weight to about 35% by weight acrylic polymer, from about 8% by weight to about 9% by weight formaldehyde/melamine resin, from about 3% by weight to about 4% by weight methyl alcohol, from about 1% by weight to about 2% by weight formaldehyde, from about 1% by weight to about 2% by weight alkylaryl polyether alcohol, a maximum of about 0.5% by weight triethylamine, and from about 51% by weight to about 52% by weight water. Rhoplex® 3208 Emulsion has a pH of from about 9.0 to about 9.5, a maximum viscosity of about 200 cps, a specific gravity of from about 1.0 to about 1.2, and a percent volatility of from about 55% to about 57%.

In each of Comparative Examples 1–12, the silicone release agent consisted of an aqueous dispersion of a cross-linkable silicone system comprising: Component (A)—about 11.2% by weight of a vinyl-functional polyorganosiloxane oil; Component (B)—about 0.8% by weight of a methylhydrogenpolysiloxane cross-linker; and Component (C)—about 0.5% by weight alkoxysilane, dispersed in about 87.5% by weight water. Thus, the dispersion had a solids content of about 12.5% by weight. For the silicone agent system of each comparative composition, 400 ppm by weight platinum catalyst (Component (D)) was added based on the weight of Component (A). The platinum catalyst (Component (D)) was premixed with the vinyl-containing dimethylpolysiloxane oil (Component (A)) by the supplier.

The vinyl-containing dimethylpolysiloxane oil (Component (A)) is represented by the formula:

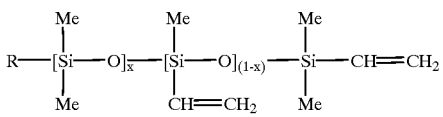

wherein each Me is a methyl group, R is randomly selected from methyl and vinyl radicals and x is greater than 0.999. The vinyl-in-oil content of Component (A) is from about 0.40% by weight to about 0.45% by weight, and the viscosity is about 500 cps.

The methylhydrogenpolysiloxane crosslinker (Component (B)) is represented by the formula:

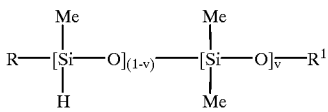

wherein each Me is a methyl group, R and $R^1$ are randomly selected from methyl and hydrogen radicals and v is about 0.5. The hydrogen-in-oil content of Component (B) is from about 0.70% by weight to about 0.76% by weight.

The gamma-(glycidoxypropyl)trimethoxysilane (Component (C)) was supplied as a non-diluted, about 100% pure, liquid composition.

In each of Comparative Examples 1–12 the coating composition was in-line applied to a freshly extruded unfilled homopolymeric polyethylene terephthalate (PET) film substrate. To form the PET substrate, an extruded PET film was cast around a chill roll and then uniaxially oriented or tentered to about 3.7 times its original, pretentered dimension in the machine direction. The coating formulation was applied in-line to the uniaxially stretched film. Then, the coated substrate was oriented or tentered to about 3.7 times its original, 14 inch, pretentered width dimension in the transverse direction. The resulting biaxially stretched PET film had a thickness of about 142 gauge and the controlled release coating on the biaxially stretched film substrate had a thickness of from about 1000 angstroms to about 2000 angstroms. The line speed of the film substrate during coating each of Comparative Examples 1–12 was 145 feet per minute.

Prior to applying the coating composition, the surface of the uniaxially oriented film substrate was corona discharge treated at a rate of about 5.5 watts per square foot per minute. The meniscus width of the coating composition applied to the 14 inch wide uniaxially stretched substrate film was 12.25 inches.

For each of the emulsions of Comparative Examples 1–12, the formulation comprised a fluid consisting of a microscopically heterogeneous mixture of the coating composition suspended in deionized water. Proprietary emulsifiers had been previously incorporated into the adhesion promoter components and/or compositions and into the silicone release agent components and/or compositions. Some of the emulsions were diluted with deionized water to obtain the reported solids contents.

The weight ratio of dry solids of the adhesion promoter to the silicone release agent for each Comparative Example is shown in Tables IX, X and XI below. Also shown in Tables IX, X and XI are the average (of three) release force measurements for each Comparative Example taken after various aging periods and under either room temperature conditions or Kiel conditions (140° F.). The samples aged under Kiel conditions were cooled to testing conditions for at least 30 minutes before being tested.

For each of Comparative Examples 1–12 the dry laydown coat weight, although neither measured nor recorded, was within the range of from about 80 dry mg/m² to about 160 dry mg/m².

In Table IX, the average (of three) release force measurements are reported for each Comparative Example wherein the measured force was the force required to release a one inch wide TESA 7475 acrylic adhesive test tape pulled at a rate of 12 inches per minute. The release reported in Table IX was measured on an Instron measuring device model 4466. The force measurements taken for the TESA 7475 tape samples resulted from test method D-5917.

In Table X, the average (of three) release force measurements are reported for each Comparative Example wherein the measured force was the force required to release a one inch wide Gelva 1753 adhesive test tape which was pulled at a rate of 12 inches per minute. The release reported in Table X was measured on an Instron measuring device model 4466.

In Table XI, the average (of three) release force measurements are reported for each Comparative Example wherein the force measured was the force required to release a two inch wide Gelva 1753 adhesive test tape which was pulled at a rate of 400 inches per minute. The release reported in Table XI was measured on a TLMI measuring device model 80-15.

The twelve compositions were each coated onto a polyethylene-terephthalate film substrate and dried during tentering of the film substrate. The coated substrates were then aged for a period of either 24 hours, 3 days, 1 week or 3 weeks. Some of the Comparative Examples were aged at ambient temperature (about 73° F.) and some were aged under Kiel conditions (140° C.). After aging, the Kiel condition samples were allowed to adjust to testing conditions of 73° F. and 50% relative humidity, before being tested.

All Gelva 1753 glue was mixed via standard chemistry laboratory procedure. The Gelva adhesive was applied with a #32 Meyer rod to the coated films of the Comparative Examples. The Comparative Example films then transferred the adhesive to the surface of a laminated polypropylene sheet. All Gelva 1753 1-inch sample testing reported in Table X was conducted at a pull angle of 180° and a rate of 12 inches per minute using method D-5918 and the Instron measuring device. All Gelva 1753 2-inch sample testing reported in Table XI was conducted at a pull angle of 90° and a rate of 400 inches per minute on the TLMI measuring device.

Results reported as "-" are for samples wherein results were not available, the test was not conducted, or data was otherwise not available. Results reported as "NO RESULT" are for samples wherein the release force was too high to be measured by the testing machine, i.e., beyond the measuring capability of the machine. Results reported as "FILM TORE" are for samples wherein the polypropylene support for the Gelva adhesive tore when separation between the adhering adhesive surface and the tested surface was attempted. The asterisks (*) shown in Table X indicate that at least one of the averaged samples had a release value of greater than 1000 g/in but was averaged in as 1000 g/in.

TABLE IX

TESA 7475 Tape

| COMPARATIVE EXAMPLE | RATIO OF ADHESION PROMOTER TO RELEASE AGENT | RELEASE FORCE AFTER AGING 24 HOURS AT ROOM TEMP. | RELEASE FORCE AFTER AGING 3 DAYS AT ROOM TEMP. | RELEASE FORCE AFTER AGING 1 WEEK AT ROOM TEMP. | RELEASE FORCE AFTER AGING 24 HOURS @ 140° C. | RELEASE FORCE AFTER AGING 3 DAYS @ 140° C. | RELEASE FORCE AFTER AGING 1 WEEK @ 140° C. |
|---|---|---|---|---|---|---|---|
| 1 | 2:1 | 734.5 | 1093 | 1148 | 1157 | 1591 | 1794 |
| 2 | 2:1 | — | 1514 | 1556 | 1278 | 1382 | 1101 |
| 3 | 2:1 | — | 1020 | 1060 | 1115 | 1253 | 1338 |
| 4 | 2:1 | 957.4 | 1357 | 1485 | 1790 | 1882 | 1851 |
| 5 | 2:1 | 860.9 | 963.5 | 1039 | 1243 | 1350 | 1522 |
| 6 | 2:1 | — | 1205 | 1258 | 1317 | 1488 | 1283 |
| 7 | 3:1 | 1097 | 1111 | 1201 | 1230 | 1504 | 1405 |
| 8 | 3:1 | 1353 | 1526 | 1612 | 1486 | 1829 | — |
| 9 | 3:1 | 1253 | 1117 | 1172 | 1214 | 1294 | 1278 |
| 10 | 3:1 | 1297 | 1383 | 1516 | 2092 | 1964 | 1829 |
| 11 | 3:1 | — | 1015 | 1133 | 1363 | 1456 | 1506 |
| 12 | 3:1 | 1299 | 1266 | 1317 | 1870 | 1675 | 1276 |

TABLE X

Gelva 1753 one-inch Adhesive Strip

| COMPARATIVE EXAMPLE | RATIO OF ADHESION PROMOTER TO RELEASE AGENT | RELEASE FORCE AFTER AGING 24 HOURS AT ROOM TEMP. | RELEASE FORCE AFTER AGING 3 WEEKS AT ROOM TEMP. | RELEASE FORCE AFTER AGING 24 HOURS @ 140° C. | RELEASE FORCE AFTER AGING 1 WEEK @ 140° C. | RELEASE FORCE AFTER AGING 3 WEEKS @ 140° C. |
|---|---|---|---|---|---|---|
| 1 | 2:1 | 641.9 | 465.2 | — | FILM TORE | FILM TORE |
| 2 | 2:1 | 321.3 | 789.55 | — | FILM TORE | FILM TORE |
| 3 | 2:1 | 453 | 624.2 | FILM TORE | FILM TORE | FILM TORE |
| 4 | 2:1 | 529 | 378.6 | — | FILM TORE | FILM TORE |
| 5 | 2:1 | 709.6 | 537.7 | FILM TORE | 376.4 | FILM TORE |
| 6 | 2:1 | 355.6 | 560.7 | FILM TORE | FILM TORE | FILM TORE |
| 7 | 3:1 | 502.1 | 682.8 | 448.4 | FILM TORE | FILM TORE |
| 8 | 3:1 | 210.4 | 458.1 | FILM TORE | FILM TORE | FILM TORE |
| 9 | 3:1 | 448.4 | 672.8 | FILM TORE | FILM TORE | FILM TORE |
| 10 | 3:1 | 480.7 | 661.8 | FILM TORE | FILM TORE | FILM TORE |
| 11 | 3:1 | 748 | 615.1 | 420.7 | FILM TORE | FILM TORE |
| 12 | 3:1 | 581.5 | 331 | 581.5 | 459.4 | 742.4 |

TABLE XI

Gelva 1753 two-inch Adhesive Strip

| COMPARATIVE EXAMPLE | RATIO OF ADHESION PROMOTER TO RELEASE AGENT | RELEASE FORCE AFTER AGING 1 DAY AT ROOM TEMP. | RELEASE FORCE AFTER AGING 1 WEEK AT ROOM TEMP. | RELEASE FORCE AFTER AGING 3 WEEKS AT ROOM TEMP. | RELEASE FORCE AFTER AGING 1 DAY @ 140° C. | RELEASE FORCE AFTER AGING 1 WEEK @ 140° C. | RELEASE FORCE AFTER AGING 3 WEEKS @ 140° C. |
|---|---|---|---|---|---|---|---|
| 1 | 2:1 | 309 | FILM TORE | FILM TORE | NO RESULT | FILM TORE | FILM TORE |
| 2 | 2:1 | NO RESULT | FILM TORE | FILM TORE | NO RESULT | FILM TORE | FILM TORE |
| 3 | 2:1 | NO RESULT | FILM TORE | FILM TORE | — | FILM TORE | FILM TORE |
| 4 | 2:1 | 219.4 | FILM TORE | FILM TORE | NO RESULT | FILM TORE | FILM TORE |
| 5 | 2:1 | NO RESULT | FILM TORE | FILM TORE | — | FILM TORE | FILM TORE |
| 6 | 2:1 | NO RESULT | FILM TORE | FILM TORE | — | FILM TORE | FILM TORE |
| 7 | 3:1 | 254.7 | FILM TORE | FILM TORE | — | FILM TORE | FILM TORE |
| 8 | 3:1 | NO RESULT | FILM TORE | FILM TORE | — | FILM TORE | FILM TORE |
| 9 | 3:1 | NO RESULT | FILM TORE | FILM TORE | — | FILM TORE | FILM TORE |
| 10 | 3:1 | NO RESULT | FILM TORE | FILM TORE | — | FILM TORE | FILM TORE |
| 11 | 3:1 | NO RESULT | FILM TORE | FILM TORE | — | FILM TORE | FILM TORE |
| 12 | 3:1 | 311.9 | FILM TORE | FILM TORE | 394.5 | FILM TORE | FILM TORE |

The release force for all of the Comparative Examples was generally very high. The coated side of the film substrate was not easily distinguished from the uncoated side. Nearly all of the TESA 7475 tape release samples reported in Table IX had average release values of at least 1000 g/in, which is about the release value of the uncoated film.

A majority of the Gelva tape release samples reported in Tables X and XI exhibited a very strong adhesion such that the polypropylene film tore when the comparative film and the tape try were pulled apart.

The release results for the 1-inch wide Gelva adhesive strips reported in Table X had various average release values of from about 300 g/in to about 800 g/in. However, the release of the 1-inch Gelva samples generally skipped so much that no reliable average could be taken. The skipping could be a result of either release coating properties (zippiness) or draw down technique.

None of the samples exhibited release values consistently below 500 g/in when tested at room temperature and under Kiel conditions and after aging for 24 hours, one week, and three weeks.

The 2-inch wide Gelva samples reported in Table XI which did not tear could not be tested due to release values in excess of about 1300 g/2 in. A weight of 1300 grams was the maximum weight capable of being exerted on the test strip by the TLMI device.

The foregoing unsuccessful results for the comparative Examples further indicate that the successful and consistent controlled release properties of the present inventive Examples are unexpected. The controlled release properties of the present compositions and present release products provide predictable and controlled release force values in a reclaimable product which works well under high and low temperature conditions and after various aging periods.

What is claimed is:

1. A controlled release coating composition adapted for application to a release backing substrate, said composition comprising an aqueous formulation containing a blend of
   (1) a water-soluble, water-dispersible or water-emulsifiable adhesion promoter, and
   (2) a water-soluble, water-dispersible or water-emulsifiable crosslinkable silicone release agent which is compatible with said adhesion to form a release surface which exhibits a release force to an adhesives of about 50 grams per inch to about 1000 grams per inch when tested with a one inch wide TESA 7475 acrylic adhesive test tape pulled at a pull rate of about 12 inches per minute after aging about one day, said release force being substantially linearly related to a solids weight ratio of adhesion promoter to silicone release agent over a solids weight ratio range of from about 0.2:1 to about 20:1,
   wherein said adhesion promoter comprises at least one member selected from the group of adhesion promoters consisting of
   (1) adhesion promoters comprising at least one ester formed from a phtalic acid radical of the formula $C_6H_4(COO)_2=$, and an alkylene or polyalkene diol or polyol,
   (2) adhesion promoters comprising from about 30% by weight to about 50% by weight methyl methacrylate from about 30% by weight to about 50% by weight ethyl acrylate, from about 1% by weight to about 10% by weight methacrylamide, and from about 5% by weight to about 25% by weight of a reactive esterified triazine,
   (3) adhesion promoters comprising from about 40% by weight to about 80% by weight methyl methacrylate, from about 20% by weight to about 50% by weight ethyl acrylate, and from about 1% by weight to about 10% by weight N-methylolacrylamide, and
   (4) adhesion promoters comprising condensed polymers of an aminoalkylalkoxysilane.

2. A controlled release coating composition as claimed in claim 1 wherein said composition comprises from about 50% by weight to about 90% by weight adhesion promoter and from about 10% by weight to about 50% by weight silicone release agent.

3. A controlled release coating composition as claimed in claim 1 wherein the silicone release agent comprises a cross-linkable system of components, said components comprising a diorganopolysiloxane silicone oil substituted with at least one substituent selected from the group consisting of terminal vinyl groups and pendant vinyl groups.

4. A controlled release coating composition as claimed in claim 1 wherein the silicone release agent comprises a cross-linkable system of components, said components comprising
   a diorganopolysiloxane silicone oil substituted with at least one member of the group consisting of terminal vinyl groups and pendant vinyl groups,
   an organohydrogenpolysiloxane crosslinker, and
   a catalytically effective amount of a crosslinking catalyst.

5. A controlled release coating composition as claimed in claim 4 wherein said components further comprise an epoxy-substituted alkoxysilane.

6. A controlled release coatng composition as claimed in claim 4 wherein said diorganopolysiloxane has the formula

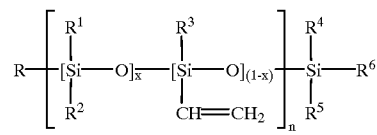

wherein each of R, $R^1$, $R^2$, $R^3$, $R^4$, $R^5$ and $R^6$ is an organic group, $n \geq 3$ and x is no greater than 0.999.

7. A controlled release coating composition as claimed in claim 6 wherein each of $R^1$, $R^2$, $R^3$, $R^4$ and $R^5$ is an alkyl radical and at least one of R and $R^6$ is a vinyl radical.

8. A controlled release coating composition as claimed in claim 4 wherein said crosslinker has the formula

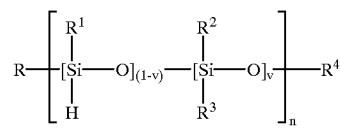

wherein each of R, $R^1$, $R^2$, $R^3$ and $R^4$ is an alkyl group, $n \geq 3$ and v is from about 0.3 to about 0.7.

9. A controlled release coating composition as claimed in claim 4 wherein said catalyst is a platinum catalyst.

10. A controlled release product comprising a polyester film substrate coated with the controlled release coating composition of claim 1 to form a release coating having a release surface, said release coating having been heated to drive off aqueous medium from said aqueous formulation and to cross-link said silicone release agent, said release surface exhibiting a substantially uniform and homogeneous distribution of cured adhesion promoter sites and cured silicone polymer release sites.

11. In combination, a substantially silicone-free adhesive composition in contact with the release surface of the controlled release product of claim 10.

12. The combination as claimed in claim 11 wherein said adhesive composition has first and second opposite adhesive surfaces and said first mentioned controlled release surface contacts said first adhesive surface, said combination further including a second controlled release surface in contact with said second adhesive surface, said second release surface having been made from a cured second controlled release coating composition, said second coating composition comprising an aqueous formulation containing a blend of said water-soluble, water-dispersible or water-emulsifiable adhesion promoter and said water-soluble, water-dispersible or water-emulsifiable crosslinkable silicone release agent, wherein the solids weight ratio of adhesion promoter to silicone release agent in said second coating composition is greater than the solids weight ratio of adhesion promoter to silicone release agent in the first mentioned controlled release coating composition.

13. A controlled release composition for making a controlled release coating for a release backing, said composition comprising an aqueous formulation containing a blend of (1) a water-soluble, water-dispersible or water-emulsifiable adhesion promoter, and (2) a water-soluble, water-dispersible or water-emulsifiable crosslinkable silicone release agent which is compatible with said adhesion promoter, said silicone release agent comprising (A) a diorganopolysiloxane silicone oil substituted with at least one substituent selected from the group consisting of terminal vinyl groups and pendant vinyl groups, (B) an alkylhydrogenpolysiloxane crosslinker, and (C) a catalytically effective amount of a crosslinking catalyst, wherein said composition can be applied to a release backing substrate and heated to form a release surface which exhibits a release force to an adhesive, said release force being substantially linearly related to the solids weight ratio of the silicone oil (A) to the cross-linking agent (B) over the solids weight ratio range of (A) to (B) of from about 0.2:1 to about 20:1.

14. A controlled release composition as claimed in claim 13, wherein said release force is also substantially linearly related to the solids weight ratio of adhesion promoter to silicone release agent over the solids weight ratio range of adhesion promoter to silicone release agent of from about 0.2:1 to about 10:1.

15. A reclaimable controlled release film product comprising a polyester film substrate and a controlled release coating, said coating having a controlled release surface and comprising a cured blend of adhesion promoter and silicone release agent, said cured blend having been formed from an aqueous formulation of a water-soluble, water-dispersible or water-emulsifiable adhesion promoter and a water-soluble, water-dispersible or water-emulsifiable crosslinkable silicone release agent which is compatible with said adhesion promoter, said release coating having been heated to drive off aqueous medium from said aqueous formulation and to cross-link said silicone release agent, said release surface exhibiting a substantially uniform and homogeneous distribution of cured adhesion promoter sites and cured silicone release agent sites, wherein said coating does not cause substantial gel formation, yellowing or odor formation at a temperature used to reclaim the polyester base substrate and at coating weight effective to provide the release surface with controlled release properties.

16. A reclaimable controlled release film product as claimed in claim 15, wherein said release surface exhibits a release force to an adhesive and the release force is substantially linearly related to the weight ratio of adhesion promoter to silicone release agent in said coating over the solids weight ratio range of adhesion promoter to release agent of from about 0.2:1 to about 20:1.

17. A reclaimable controlled release film product as claimed in claim 15 wherein said cured blend comprises from about 50% by weight to about 90% by weight cured adhesion promoter and from about 10% by weight to about 50% by weight cured silicone release agent, based on the total water-removed solids weight of the coating.

18. A reclaimable controlled release film product as claimed in claim 15 wherein said silicone release agent comprises a cross-linkable system of components, said components comprising:
a diorganopolysiloxane silicone oil substituted with at least one member of the group consisting of terminal vinyl groups and pendant vinyl groups,
an organohydrogenpolysiloxane crosslinker, and
a catalytically effective amount of a crosslinking catalyst.

19. A reclaimable controlled release film product as claimed in claim 18 wherein said components further comprise an epoxy-substituted alkoxysilane.

20. A reclaimable controlled release film product as claimed in claim 19 wherein said alkoxysilane is gamma-(glycidoxypropyl)trimethoxysilane.

21. A reclaimable controlled release film product as claimed in claim 15 wherein said adhesion promoter comprises at least one member selected from the group of adhesion promoters consisting of (1) adhesion promoters comprising at least one ester formed from a phthalic acid radical of the formula $C_6H_4(COO)_2=$, and an alkylene or polyalkylene diol or polyol, (2) adhesion promoters comprising from about 30% by weight to about 50% by weight methyl methacrylate, from about 30% by weight to about 50% by weight ethyl acrylate, from about 1% by weight to about 10% by weight methacrylamide, and from about 5% by weight to about 25% by weight of a reactive esterified triazine, (3) adhesion promoters comprising from about 40% by weight to about 80% by weight methyl methacrylate, from about 20% by weight to about 50% by weight ethyl acrylate, and from about 1% by weight to about 10% by weight N-methylolacrylamide, and (4) adhesion promoters comprising condensed polymers of an aminoalkylalkoxysilane.

22. A reclaimable controlled release film product as claimed in claim 21 wherein said adhesion promoter comprises at least one ester formed from a phthalic acid radical of the formula $C_6H_4(COO)_2=$, and an alkylene diol.

23. A reclaimable controlled release film product as claimed in claim 22 wherein said at least one ester comprises dimethylisophthalate and a sodium salt of dimethyl-5-sulfo isophthalate in a weight ratio of from about 5:1 to about 15:1, and said diol comprises ethylene glycol.

24. A reclaimable controlled release film product as claimed in claim 22 wherein the weight ratio of said at least one ester to said diol is about 1:1.

25. A reclaimable controlled release film product as claimed in claim 15 wherein said adhesion promoter comprises a water-dispersible acrylic emulsion of at least one alkyl acrylate.

26. A reclaimable controlled release film product as claimed in claim 25 wherein said at least one alkyl acrylate comprises methyl methacrylate, ethyl acrylate and at least one member selected from the group consisting of: (1) methacrylamide and an esterified triazine, and (2) N-methylolacrylamide.

27. A reclaimable controlled release film product as claimed in claim 15 wherein said adhesion promoter includes a reactive comonomer and comprises from about 30% by weight to about 50% by weight methyl methacrylate, from about 30% by weight to about 50% by weight ethyl acrylate, from about 1% by weight to about 10% by weight methacrylamide, and from about 5% by weight to about 25% by weight of a reactive esterified triazine.

28. A reclaimable controlled release film product as claimed in claim 27 wherein said reactive esterified triazine comprises hexamethoxymethyl melamine.

29. A reclaimable controlled release film product as claimed in claim 15 wherein said adhesion promoter comprises from about 40% by weight to about 80% by weight methyl methacrylate, from about 20% by weight to about 50% by weight ethyl acrylate, and from about 1% by weight to about 10% by weight N-methylolacrylamide.

30. A reclaimable controlled release film product as claimed in claim 20 wherein said release surface has a peel strength of from about 50 g/in to about 1000 g/in when tested with a one inch-wide TESA 7475 acrylic adhesive test tape pulled at a pull rate of about 12 inches per minute after aging one day.

31. In combination, a substantially silicone-free adhesive composition in contact with the release surface of the controlled release film product claimed in claim 15.

32. The combination as claimed in claim 31 wherein said adhesive composition has first and second opposite adhesive surfaces and said first mentioned release surface contacts said first adhesive surface, said combination further including a second controlled release coating having a second controlled release surface in contact with said second adhesive surface, said second release surface comprising a cured blend of said water-soluble, water-dispersible or water-emulsifiable adhesion promoter and said water-soluble, water-dispersible or water-emulsifiable crosslinkable silicone release agent, the solids weight ratio of adhesion promoter to silicone release agent in said second coating being greater than the solids weight ratio of adhesion promoter to silicone release agent in said first mentioned release surface.

33. A controlled release product comprising a substrate and a controlled release coating on said substrate, said coating having a release surface and comprising a cured blend of adhesion promoter and silicone release agent, said cured blend having been formed from an aqueous emulsion of: (1) a water-soluble, water-dispersible or water-emulsifiable reactive adhesion promoter containing a polymerizable monomer, and (2) a water-soluble, water-dispersible or water-emulsifiable crosslinkable silicone release agent which is compatible with said reactive adhesion promoter, said release coating having been heated to cure said reactive monomer and cross-link said silicone release agent, said release surface exhibiting thereon a substantially uniform and homogeneous distribution of cured adhesion promoter sites and cured silicone polymer release sites.

34. A controlled release product as claimed in claim 33 wherein said reactive adhesion promoter comprises methyl methacrylate, ethyl acrylate, methacrylamide and a reactive esterified triazine.

35. A controlled release product as claimed in claim 33 wherein said reactive adhesion promoter comprises from about 30% by weight to about 50% by weight methyl methacrylate, from about 30% by weight to about 50% by weight ethyl acrylate, from about 1% by weight to about 10% by weight methacrylamide, and from about 5% by weight to about 25% by weight of an esterified triazine.

36. A controlled release product as claimed in claim 33 wherein said reactive esterified triazine comprises hexamethoxymethyl melamine.

37. A controlled release product as claimed in claim 33 wherein said reactive adhesion promoter comprises a water-dispersible cross-linkable aminoalkylalkoxysilane.

38. A controlled release product as claimed in claim 37 wherein said cross-linkable aminoalkylalkoxysilane comprises N-(2-aminoethyl)-3-aminopropyltrimethoxysilane.

39. A method of making a controlled release product comprising a substrate and a controlled release coating on said substrate having a controlled release surface, said method comprising:

providing a coating formulation comprising an aqueous medium, a water-soluble, water-dispersible or water-emulsifiable adhesion promoter, and a water-soluble, water-dispersible or water-emulsifiable crosslinkable silicone release agent which is compatible with said adhesion promoter to form a homogeneous distribution of the adhesion promoter and the silicone release agent in said aqueous emulsion medium, extruding a polymeric film substrate, in-line coating the extruded polymeric film substrate with a substantially uniform thin layer of said coating formulation to form a coated substrate, heating the coated substrate to a temperature sufficient to evaporate the aqueous medium and cross-link the silicone release agent to form a controlled release surface, said controlled release surface exhibiting a substantially uniform and homogeneous distribution of cured adhesion promoter sites and cured silicone polymer release agent sites thereon, and stretching said coated substrate at about said temperature.

40. A method as claimed in claim 39 wherein said adhesion promoter comprises at least one member selected from the group of adhesion promoters consisting of (1) adhesion promoters comprising at least one ester formed from a phthalic acid radical of the formula $C_6H_4(COO)_2$=, and an alkylene or polyalkylene diol or polyol, (2) adhesion promoters comprising from about 30% by weight to about 50% by weight methyl methacrylate, from about 30% by weight to about 50% by weight ethyl acrylate, from about 1% by weight to about 10% by weight methacrylamide, and from about 5% by weight to about 25% by weight of a reactive esterified triazine, (3) adhesion promoters comprising from about 40% by weight to about 80% by weight methyl methacrylate, from about 20% by weight to about 50% by weight ethyl acrylate, and from about 1% by weight to about 10% by weight N-methylolacrylamide, and (4) adhesion promoters comprising condensed polymers of an aminoalkylalkoxysilane.

41. A method as claimed in claim 39 wherein said adhesion promoter is at least one member selected from the group consisting of adhesion promoters (2) and (4), and the temperature is sufficient to polymerize reactive monomeric components in the adhesion promoter.

42. A method as claimed in claim 39 wherein said polymeric film substrate has first and second opposite surfaces, said in-line coating comprises coating the first surface of said substrate, and said method further comprises applying a second release coating composition to the second surface.

43. A controlled release product as claimed in claim 33, wherein said coating is present at a coating weight of about 0.02 lb./ream to about 0.10 lb./ream.

44. A controlled release product as claimed in claim 33, wherein said coating is present at a coating thickness of about 750 angstroms to about 1500 angstroms.

45. A method of formulating a composition as claimed in claim 1, further comprising the step of adjusting said release force by adjusting said solids weight ratio.

46. A method of formulating a composition as claimed in claim 4, further comprising the step of adjusting said release force by adjusting a weight ratio of said diorganopolysiloxane silicone oil to said organohydrogenpolysiloxane crosslinker.

* * * * *